United States Patent
Cariou et al.

(10) Patent No.: US 12,250,592 B2
(45) Date of Patent: Mar. 11, 2025

(54) METHODS AND ARRANGEMENTS FOR APPLICATION SERVICE DISCOVERY

(71) Applicant: Intel Corporation, Santa Clara, CA (US)

(72) Inventors: Laurent Cariou, Milizac (FR); Dave Cavalcanti, Portland, OR (US); Dibakar Das, Hillsboro, OR (US); Chittabrata Ghosh, Fremont, CA (US); Ganesh Venkatesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 17/359,558

(22) Filed: Jun. 26, 2021

(65) Prior Publication Data

US 2021/0329500 A1  Oct. 21, 2021

Related U.S. Application Data

(60) Provisional application No. 63/047,125, filed on Jul. 1, 2020.

(51) Int. Cl.
*H04W 28/24* (2009.01)
*H04W 8/24* (2009.01)
*H04W 74/00* (2009.01)
*H04W 80/02* (2009.01)

(52) U.S. Cl.
CPC ............. *H04W 28/24* (2013.01); *H04W 8/24* (2013.01); *H04W 74/002* (2013.01); *H04W 80/02* (2013.01)

(58) Field of Classification Search
CPC ... H04W 28/24; H04W 80/02; H04W 74/006; H04W 48/08; H04W 8/24; H04W 74/002; H04W 84/12; H04W 88/08
See application file for complete search history.

(56) References Cited

U.S. PATENT DOCUMENTS

| | | | |
|---|---|---|---|
| 2021/0007168 A1* | 1/2021 | Asterjadhi | H04W 52/0216 |
| 2021/0282047 A1* | 9/2021 | Cherian | H04W 4/80 |
| 2021/0297184 A1* | 9/2021 | Huang | H04L 1/1896 |
| 2021/0360521 A1* | 11/2021 | Seok | H04W 74/0816 |
| 2021/0385692 A1* | 12/2021 | Kwon | H04W 52/0229 |
| 2022/0255681 A1* | 8/2022 | Huang | H04L 5/0055 |

(Continued)

OTHER PUBLICATIONS

D. Lopez-Perez, A. Garcia-Rodriguez, L. Galati-Giordano, M. Kasslin and K. Doppler, "IEEE 802.11be Extremely High Throughput: The Next Generation of Wi-Fi Technology Beyond 802.11ax," in IEEE Communications Magazine, vol. 57, No. 9, pp. 113-119, Sep. 2019, doi: 10.1109/MCOM.001.1900338. (Year: 2019).*

*Primary Examiner* — Ricky Q Ngo
*Assistant Examiner* — Kabir U Jahangir
(74) *Attorney, Agent, or Firm* — KDW Firm PLLC

(57) ABSTRACT

Logic to generate an extremely high throughput (EHT) physical layer protocol data unit (PPDU) comprising a medium access control (MAC) management frame. the MAC management frame comprising a QoS management field. the QoS management field comprising at least one bit value to indicate quality of service (QoS) management capability associated with links associated with more than one frequency bands. Logic to cause the transmission of the EHT PPDU. And logic to receive and decode the EHT PPDU.

25 Claims, 17 Drawing Sheets

(56) References Cited

U.S. PATENT DOCUMENTS

| | | | |
|---|---|---|---|
| 2023/0103810 A1* | 4/2023 | Kim | H04W 76/15 |
| | | | 370/329 |
| 2023/0110435 A1* | 4/2023 | Yu | H04L 5/0094 |
| | | | 370/329 |
| 2023/0140556 A1* | 5/2023 | Ko | H04L 5/0053 |
| | | | 370/329 |
| 2023/0156840 A1* | 5/2023 | Chitrakar | H04B 17/309 |
| | | | 370/329 |
| 2023/0319629 A1* | 10/2023 | Ko | H04L 5/0044 |
| | | | 370/230 |

* cited by examiner

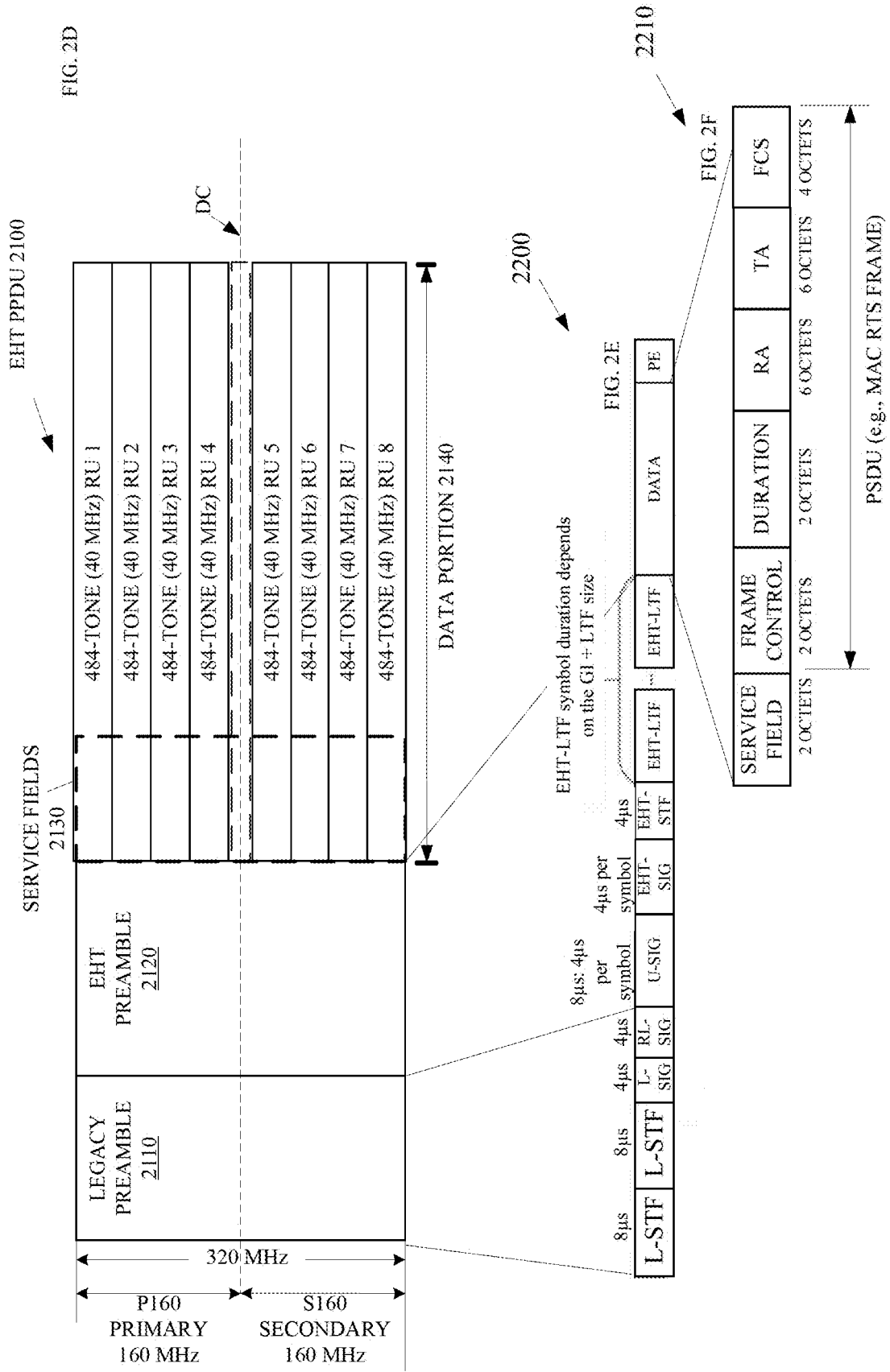

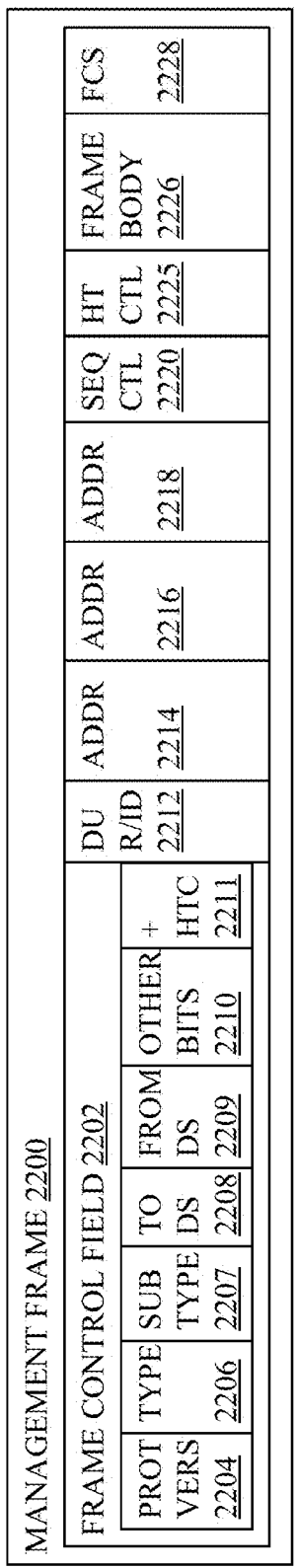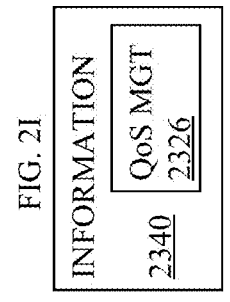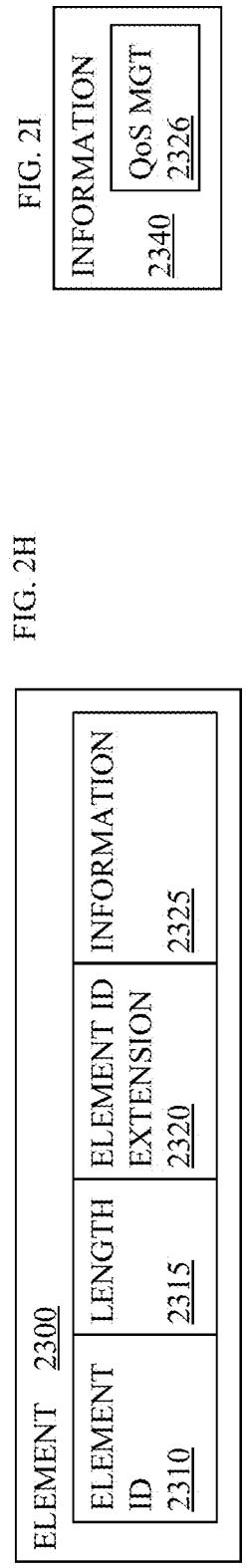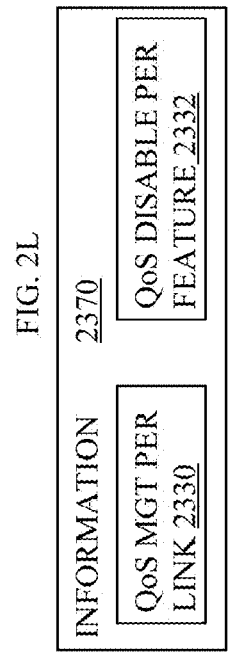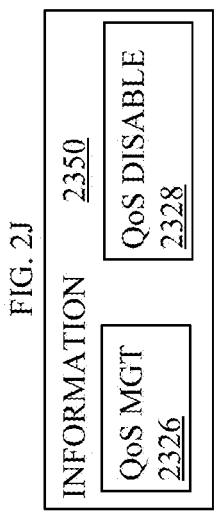

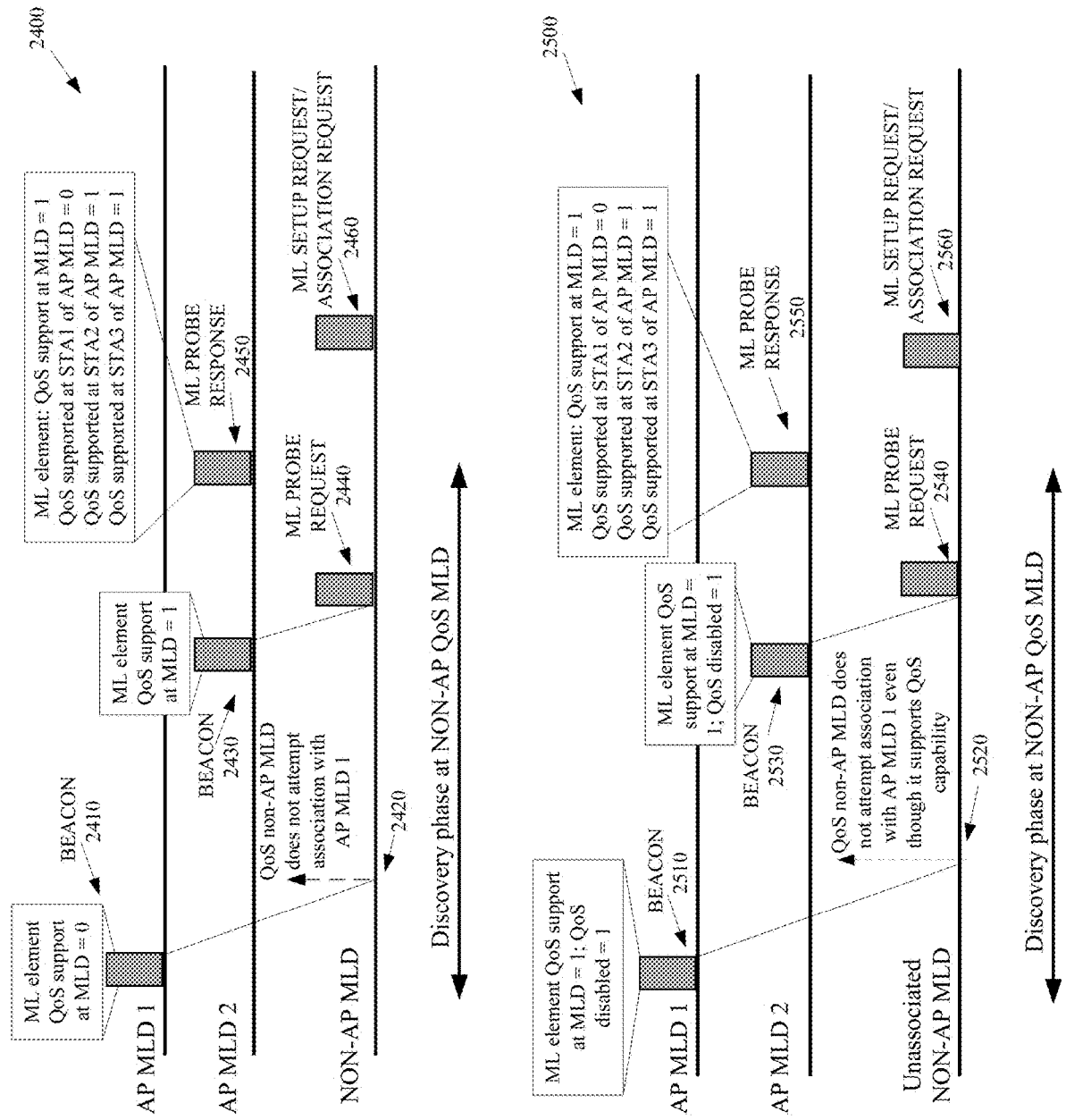

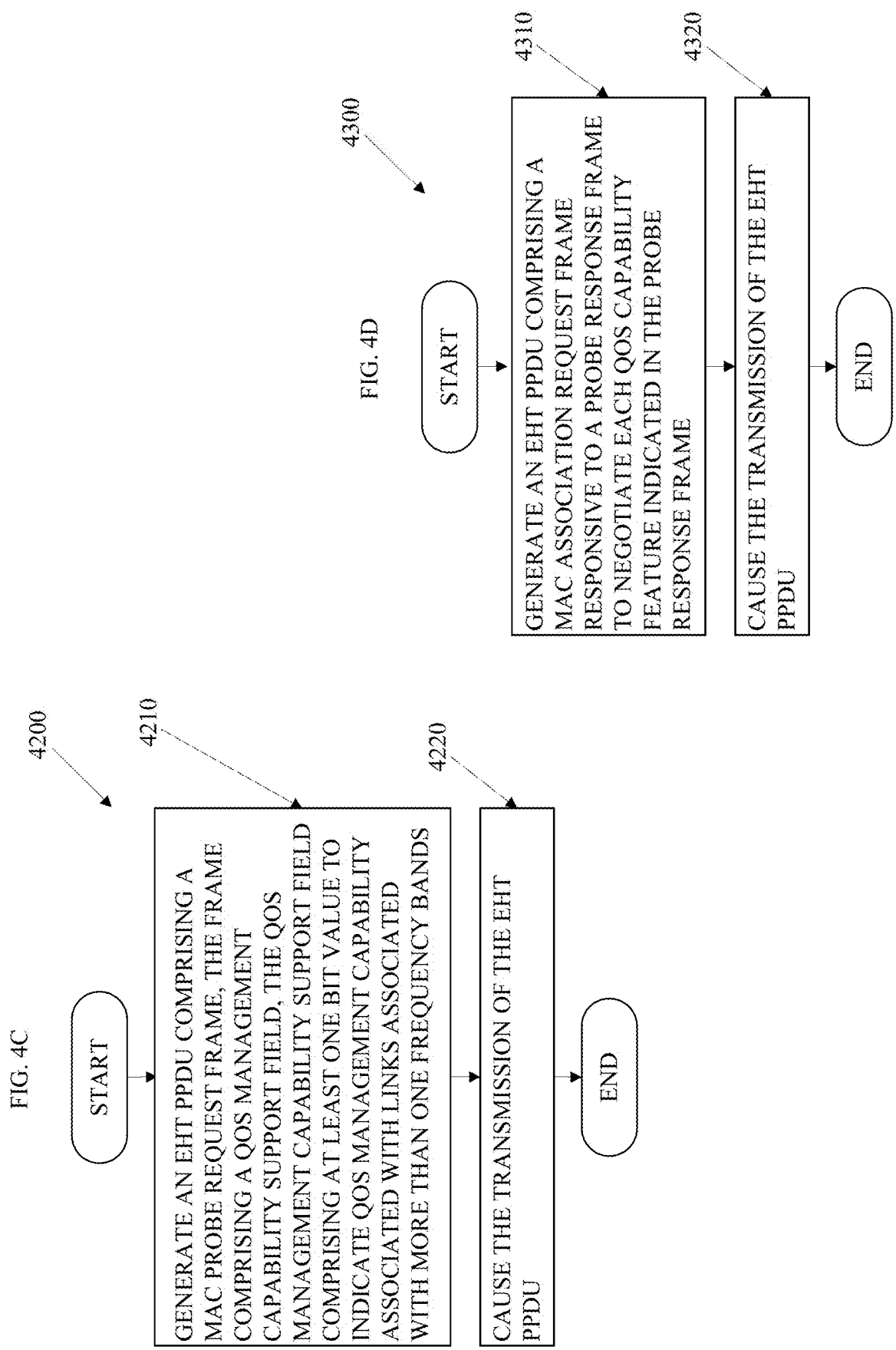

METHODS AND ARRANGEMENTS FOR APPLICATION SERVICE DISCOVERY

CROSS REFERENCE TO RELATED APPLICATIONS

This application also claims priority under 35 USC § 119 from U.S. Provisional Application No. 63/047,125, entitled "MECHANISM TO ADVERTISE QUALITY OF SERVICE MANAGEMENT CAPABILITY", filed on Jul. 1, 2020, the subject matter of which is incorporated herein by reference.

TECHNICAL FIELD

This disclosure generally relates to systems and methods for wireless communications and, more particularly, to advertise quality of service (QoS) management capability.

BACKGROUND

The increase in interest in network and Internet connectivity and Internet of Things (IoT) drives design and production of new wireless products. The escalating numbers of wireless devices active as well as the bandwidth demands of the users of such devices are increasing bandwidth demands for access to wireless channels. The Institute of Electrical and Electronics Engineers (IEEE) is developing one or more new standards that utilize Orthogonal Frequency-Division Multiple Access (OFDMA) and non-OFDMA in channel allocation to increase bandwidth and data throughput capabilities of the devices such as access points to increase bandwidth and data throughput demands from users. These new standards require operability with legacy devices and other concurrently developing communications standards.

BRIEF DESCRIPTION OF THE DRAWINGS

FIG. 2D depicts an embodiment of an IEEE 802.11be extremely high throughput (EHT) physical layer protocol data unit (PPDU) transmitted on an orthogonal frequency-division multiple access (OFDMA) modulated signal.

FIG. 2E depicts another embodiment of an IEEE 802.11be EHT PPDU.

FIG. 2F depicts an embodiment of a data field of an IEEE 802.11be EHT PPDU including a service field and a medium access control (MAC) RTS frame.

FIGS. 2G-L depict embodiments of medium access control (MAC) frames for QoS discovery.

FIGS. 2M-N depict embodiments of timing diagrams/frame exchanges for discovery of QoS management capability.

FIGS. 4C-D depict embodiments of flowcharts to generate and transmit a probe request frame and an association request frame to negotiate QoS management capability features.

DETAILED DESCRIPTION OF EMBODIMENTS

Figure 1A:
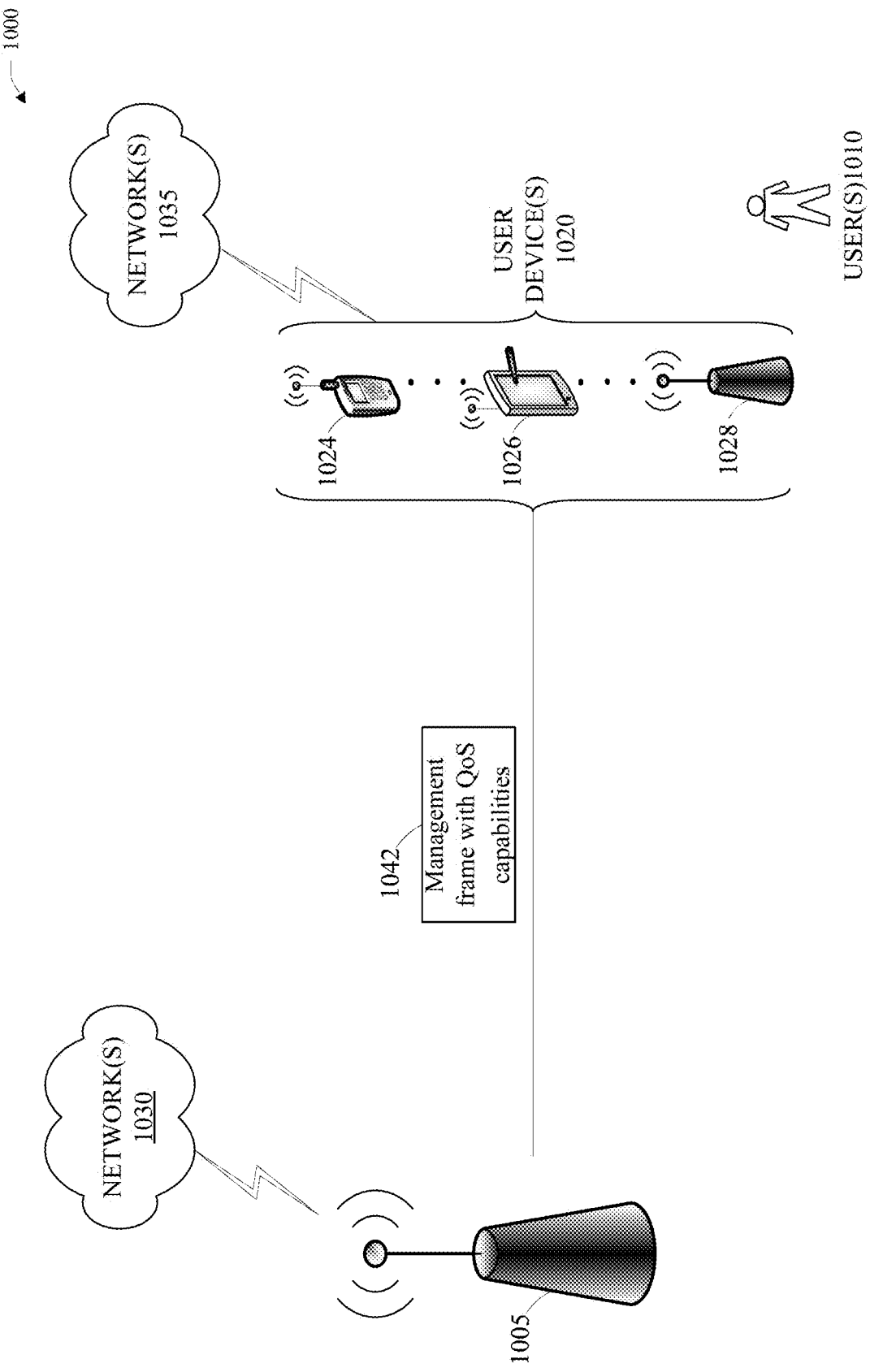
FIG. 1A is a system diagram illustrating an embodiment of a network environment for data scrambler logic circuitry, in accordance with one or more example embodiments.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Embodiments relate to quality of service (QoS) management logic circuitry such as QoS AP MLD logic circuitry and QoS non-AP MLD logic circuitry to facilitate QoS communications by stations (STAs) in accordance with versions of Institute of Electrical and Electronics Engineers (IEEE) 802.11 standards for wireless communications such as IEEE P802.11be™/D1.0, May 2021; IEEE 802.11-2020, December 2020; IEEE P802.11ax™/D8.0, IEEE P802.11ay™/D7.0, IEEE P802.11az™/D3.0, IEEE P802.11ba™/D8.0, IEEE P802.11bb™/D0.4, IEEE P802.11bc™/D1.02, and IEEE P802.11bd™/D1.1.

MLDs and QoS Management

The IEEE 802.11be protocol will allow a Wi-Fi device, referred to as a Multi-link device (MLD), to communicate with another MLD using multiple links on different bands such as 2.4 gigahertz (GHz), 5 GHz, and 6 GHz. A non-AP STA MLD can setup more than one link with an AP MLD on different bands thereby benefiting from additional channel access opportunities via Multi-link operation (MLO).

802.11be is also focusing on improving latency and support real-time applications. Embodiments may define a mechanism to allow a non-AP STA MLD to request an AP MLD to allocate resources (in time and frequency) for a real-time traffic stream. The request may also include the parameters for that particular traffic stream such as: data rate, latency bound, reliability, IP address, Port number etc.

QoS management for MLDs refers to MLO in terms of stream/flow identification of such real-time applications, corresponding traffic classification belonging to traffic identifiers (TIDs) 8-15, and prioritized channel access. The AP MLD may also allocate resources to a non-AP MLD in an unsolicited fashion to support a particular traffic stream in downlink (DL) or uplink (UL).

In some embodiments, not all AP MLDs will have the capability to implement and support such QoS management for MLDs. In such embodiments, a non-AP STA MLD that expects a certain QoS management support may seek to associate/setup MLs with AP MLDs that can support this capability and QoS management.

In some embodiments, an AP MLD that supports QoS management capability announces the QoS management capability in a Management frame used for discovery such as beacon frames, probe response frames, and the like. In some embodiments, the AP MLD may, advantageously, provide a single bit announcement in broadcast frames such as beacon frames to indicate the QoS management capability and advantageously provide mode detailed information to non-AP MLDs in response to requests via management frames such as probe requests, association requests, and reassociation requests.

In further embodiments, the AP MLD may, advantageously, signal that it is temporarily unable to provide QoS management or accept new QoS negotiation on one or more links. Some embodiments may signal temporary disablement of QoS management on one or more links or temporary disablement of ability to accept new QoS management capability negotiation on one or more links via management frame elements such as an EHT Operation element or another element.

AP MLD QoS Management Capability

In some embodiments, AP MLDs may include QoS management capability including a requirement by admitted/negotiated STA MLDs to respect some protected/reserved service periods, e.g., restricted target wake time (TWT) service periods, announced by the AP MLD and/or to not transmit using EDCA outside service periods (SPs) allocated to admitted STA MLDs by the AP MLD.

A restricted TWT service period is a restricted period of time during which certain stations (STAs) can transmit and/or receive frames. A restricted target wake time (TWT) is a TWT with enhanced medium access protection and resource reservation for latency sensitive traffic. Traffic originating from many real time applications has stringent latency requirements (e.g., very low average latency and worst case latency of the order of a few to tens of milliseconds, and small jitter, all of which can have certain reliability constraints as well). Such traffic is also referred to as latency sensitive traffic. Restricted target wake time (TWT) operation allows an AP to use enhanced medium access protection and resource reservation mechanisms to provide more predictable latency, reduced worst case latency, and/or reduced jitter, with higher reliability for latency sensitive traffic.

An EHT STA that supports restricted TWT operation shall set the restricted TWT support subfield in transmitted EHT Capabilities elements to 1. If the EHT STA does not support restricted TWT support, the STA shall set the Restricted TWT Support subfield in transmitted EHT Capabilities elements to 0.

A non-AP EHT STA may establish membership for one or more restricted TWT schedules with its associated EHT AP by establishing and following the rules defined in a restricted TWT agreement setup via negotiation with the EHT AP, which is a feature of the QoS management capability of the EHT AP. An EHT AP with the feature of TWT agreement setup may announce one or more restricted TWT service periods. EHT STAs that support restricted TWT operation follow the rules for broadcasting TWT operation and the additional rules and restrictions for channel access rules for restricted TWT service periods if the EHT AP has announced restricted TWT service periods.

In some embodiments, AP MLDs may include QoS management capability including the ability to transmit and receive data frames, support block acknowledgements (BAs) and BA sizes for one or more of TIDs 8-15. In some embodiments, the QoS management may support BA sizes such as 256 medium access control (MAC) protocol data units (MPDUs) and 1024 MPDUs.

In some embodiments, AP MLDs may include QoS management capability including support for negotiation of EHT QoS features by a non-AP MLD. In some embodiments, AP MLDs may include QoS management capability including baseline QoS negotiation mechanisms such as stream classification service (SCS), mirrored stream classification service (MSCS), and simple reflective query (SRQ)). In some of these embodiments, the QoS negotiation mechanisms negotiate capabilities or features of the QoS management capability that are valid across the entire MLD, i.e., all links supported by the AP MLD and not just in the link in which the AP MLD negotiated the QoS management capability with the non-AP MLD.

In some embodiments, AP MLDs may include QoS management capability including support of advanced QoS capabilities for enabling time-sensitive network (TSN) integration such as time-aware scheduling, redundancy, and the like. An AP STA MLD may also be referred to as a QoS AP MLD if the AP MLD supports QoS management capability.

Non-AP MLD QoS Management Capability Support

In some embodiments, non-AP MLDs may include capability for QoS management support including the ability to transmit and receive data frames, support for BAs and BA sizes, such as 256 MPDUs and 1024 MPDUs, for one or more of TIDs 8-15. In some embodiments, the QoS management may support BA sizes such as 256 medium access control (MAC) protocol data units (MPDUs) and 1024 MPDUs. In some embodiments, non-AP MLDs may include capability for QoS management support including support for negotiation of QoS management features.

In some embodiments, non-AP MLDs may include capability for QoS management support including support for baseline QoS negotiation mechanisms (e.g., MSCS, SRQ) valid across the entire AP MLD and not just valid in the link in which the AP MLD negotiated QoS management support with non-AP MLD.

In some embodiments, non-AP MLDs may include capability for QoS management support including support of advanced QoS capabilities for enabling TSN integration (e.g. time-aware scheduling, redundancy). A non-AP STA MLD that includes QoS management support may also be referred to as a QoS non-AP MLD.

Advertisement by AP MLD for Discovery

In some embodiments, a QoS management logic circuitry may facilitate advertisement by a QoS AP MLD, of the QoS AP MLDs QoS management capability in an element or field inside a management frame. In some embodiments, the signaling is present in a new or existing element used to advertisement Multi-link features (e.g., a Multi-link attribute element). This signaling can be inside the common part of the multiple links (ML) element.

In some embodiments, a QoS management logic circuitry may facilitate advertisement by a QoS AP MLD, of the QoS AP MLDs QoS management capability in an element in a Beacon frame. In some embodiments, the element containing above the QoS AP MLDs QoS management capability in a Probe Response frame or a Probe Response frame carrying information for an MLD. In such embodiments, the Probe Response frame may be broadcast or unicast.

In one embodiment, QoS AP MLDs can advertise, or signal, QoS management capability in a reduced neighbor report (RNR) element carried in a management frame (e.g., Beacon, Probe Response). In some embodiments, QoS AP MLDs can advertise, or signal, QoS management capability in a Multiple basic service set identifier (BSSID) element carried in a management frame. For example, QoS AP MLDs may advertise, or signal, QoS management capability with an indication in a Nontransmitted BSSID Capability element of a Nontransmitted BSSID Profile subelement.

In some embodiments, QoS AP MLDs can advertise, or signal, QoS management capability in a Neighbor Report element carried in a management frame. In some embodiments, QoS AP MLDs can advertise, or signal, QoS management capability with a single bit value to signal the presence of all the features. In some embodiments, QoS AP MLDs can advertise, or signal, QoS management capability with a bit representing each QoS management capability or feature separately. For example, one bit may signal whether AP MLD requires STAs to respect protected SPs, one bit may signal whether QoS negotiation is supported, and the like. In one embodiment, QoS AP MLDs can advertise, or signal, QoS management capability including support for advanced QoS capabilities enabling integration with 802.1 time-sensitive networking (TSN) standards, such as time-aware scheduling (802.1Qbv), and redundancy (802.1CB).

Advertisement by Non-AP MLD for Discovery

In some embodiments, a QoS management logic circuitry may facilitate announcement (signaling), by a QoS non-AP MLD, of a QoS management capability support in an element or field inside a management frame. In some embodiments, the signaling is present in a new or existing element used to signal Multi-link features (e.g., a Multi-link attribute element). This signaling can be inside the common/MLD-level part of the ML element sent in a Probe Request.

In some embodiments, a QoS management logic circuitry may facilitate announcement (signaling), by a QoS non-AP MLD, of a QoS management capability support with a single bit value to signal support of all the QoS management capability features.

In one embodiment, a QoS management logic circuitry may facilitate announcement (signaling), by a QoS non-AP MLD, of a QoS management capability support with a bit representing each feature separately. For example, one bit may signal whether MSCS or SRQ is valid across all links in an MLD, one bit may signal whether the non-AP MLD supports data frames with TIDs being 8-15, and the like. In one embodiment, the signaling may identify support for advanced QoS capabilities enabling integration with 802.1 TSN standards, such as time-aware scheduling (802.1Qbv), and redundancy (802.1CB).

In some embodiments, a QoS management logic circuitry may facilitate discovery by a QoS non-AP MLD can discover of the basic QoS management capability information at the AP MLD in a broadcast frame (e.g., Beacon) but discovers some detailed link specific information as response to a request for the same. For example, the QoS non-AP MLD can transmit a MLD Probe Request in response to which the QoS AP MLD transmits a response containing details of QoS support at each affiliated STA. Such link-specific information includes:

Whether an affiliated STA supports QoS capability.
Whether an affiliated STA supports a specific set of TIDs greater than 8.
Information about any protected SP at the affiliated STA.
Information about advanced QoS capabilities for TSN enablement;

Interaction Between AP MLD and Non-AP MLD for Discovery Procedure

On discovering QoS AP MLD support for QoS management capability or a particular feature of the QoS management capability, a non-AP MLD (both QoS non-AP MLD and regular non-AP MLD) may decide whether to setup MLO with that MLD or not in implementation-specific manner.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with discovery of QoS management capability; discovery of each of the QoS management capability features; discovery of availability of the QoS management capability; discovery of availability of the QoS management capability features; discovery of QoS management capability temporarily disabled; discovery of QoS management capability features temporarily disabled; and/or the like.

Different technical problems such as those discussed above may be addressed by one or more different embodiments. Embodiments may address one or more of these problems associated with discovery of QoS management capability. For instance, some embodiments that address problems associated with discovery of QoS management capability may do so by one or more different technical means, such as, generating an extremely high throughput (EHT) physical layer protocol data unit (PPDU) comprising a medium access control (MAC) management frame, the MAC management frame comprising a QoS management field; the QoS management field comprising at least one bit value to indicate quality of service (QoS) management capability associated with links associated with more than one frequency bands; causing the transmission of the EHT PPDU; the MAC management frame comprising a beacon frame or a probe response frame; the at least one bit value comprising a single bit value to signal QoS management capability associated with links in each of the more than one frequency bands; the at least one bit value comprising a bit value for each of multiple features of the QoS management capability, wherein at least one of the multiple features includes negotiation of an agreement to respect restricted TWT service periods; the more than one frequency bands comprising two or more of 2.4 gigahertz (GHz), 5 GHz, and 6 GHz; wherein the MAC management frame further comprises a QoS disabled field, the QoS disabled field comprising a single bit value to indicate that the QoS management capability associated with links in each of the more than one frequency bands is temporarily disabled; wherein the MAC management frame further comprises a QoS disabled field, the QoS disabled field comprising multiple bit values, each of the bit values identifying one of the links, to individually identify each link of the links for which the QoS management capability associated with the link is temporarily disabled; wherein the QoS management field resides in an element in a frame body of the management frame; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A system diagram illustrating an embodiment of a network environment for QoS management logic circuitry. Wireless network 1000 may include one or more user devices 1020 and one or more access points(s) (AP) 1005, which may communicate in accordance with IEEE 802.11 communication standards. The AP 1005 may comprise an QoS AP MLD with QoS management capability and the user devices may include one or more QoS non-AP MLDs with support for QoS management capability features offered by the AP 1005 on links in more than one frequency bands. The user device(s) 1020 may comprise mobile devices that are non-stationary (e.g., not having fixed locations) and/or stationary devices.

Figure 3:
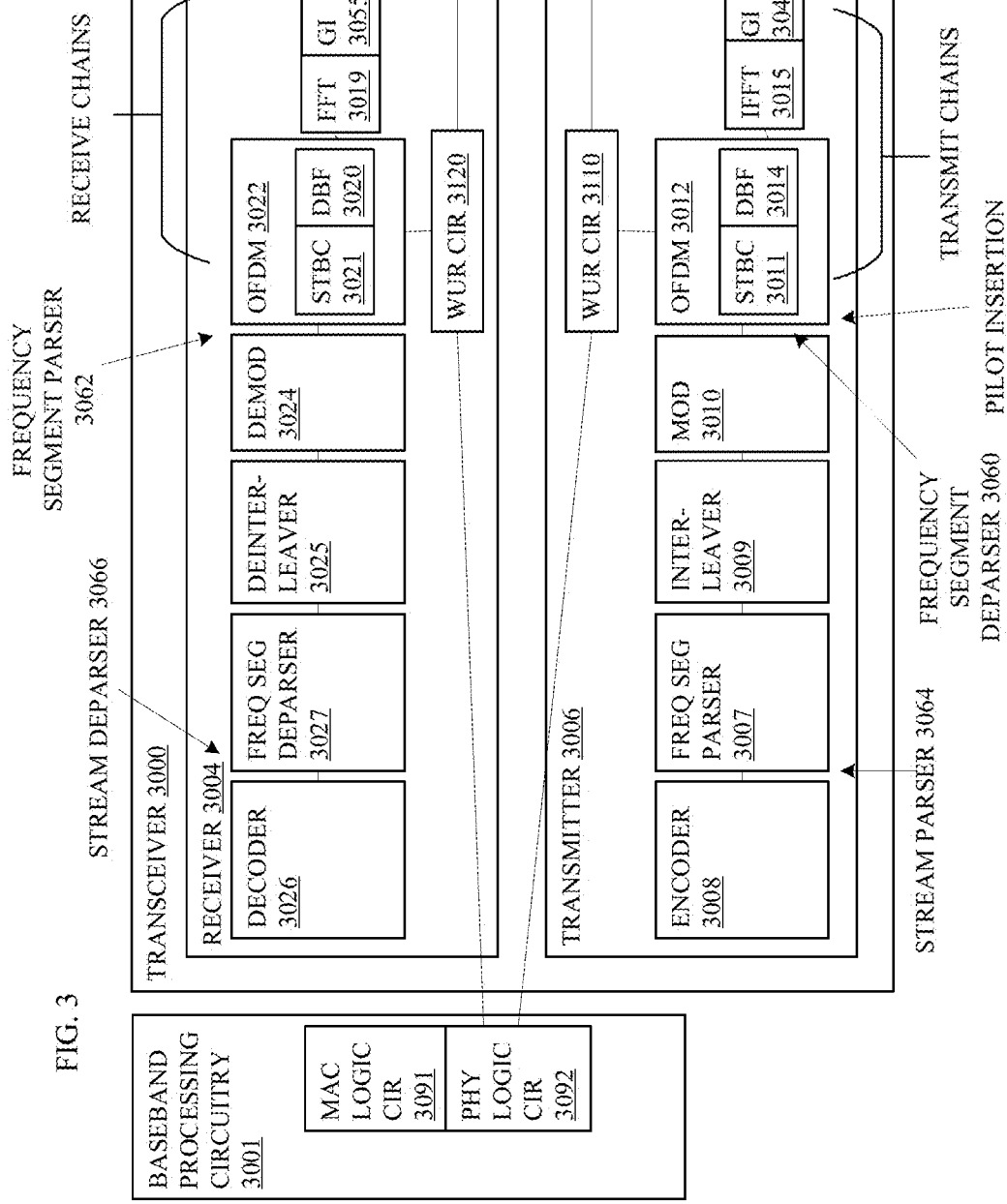
FIG. 3 depicts an embodiment of a wireless interface.

In some embodiments, the user devices 1020 and the AP 1005 may include one or more computer systems similar to that of the functional diagram of FIG. 3 and/or the example machine/system of FIGS. 5, 6, 7, and 8.

One or more illustrative user device(s) 1020 and/or AP(s) 1005 may be operable by one or more user(s) 1010. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 1020 and the AP(s) 1005 may be STAs. The one or more illustrative user device(s) 1020 and/or AP(s) 1005 may operate as a personal basic service set (PBSS) control point/access point (PCP/AP). The user device(s) 1020 (e.g., 1024, 1026, or 1028) and/or AP(s) 1005 may include any suitable processor-driven device including, but not limited to, a mobile device or a non-mobile, e.g., a static device. For example, user device(s) 1020 and/or AP(s) 1005 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020 and/or AP(s) 1005 may also include mesh stations in, for example, a mesh network, in accordance with one or more IEEE 802.11 standards and/or 3GPP standards.

Any of the user device(s) 1020 (e.g., user devices 1024, 1026, 1028), and AP(s) 1005 may be configured to communicate with each other via one or more communications networks 1030 and/or 1035 wirelessly or wired. The user device(s) 1020 may also communicate peer-to-peer or directly with each other with or without the AP(s) 1005. Any of the communications networks 1030 and/or 1035 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1030 and/or 1035 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1030 and/or 1035 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020 (e.g., user devices 1024, 1026, 1028) and AP(s) 1005 may include one or more communications antennas. The one or more communications antennas may be any suitable type of antennas corresponding to the communications protocols used by the user device(s) 1020 (e.g., user devices 1024, 1026 and 1028), and AP(s) 1005. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 1020 and/or AP(s) 1005.

Any of the user device(s) 1020 (e.g., user devices 1024, 1026, 1028), and AP(s) 1005 may be configured to perform directional transmission and/or directional reception in conjunction with wirelessly communicating in a wireless network. Any of the user device(s) 1020 (e.g., user devices 1024, 1026, 1028), and AP(s) 1005 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020 (e.g., user devices 1024, 1026, 1028), and AP(s) 1005 may be configured to perform any given directional transmission towards one or more defined transmit sectors. Any of the user device(s) 1020 (e.g., user devices 1024, 1026, 1028), and AP(s) 1005 may be configured to perform any given directional reception from one or more defined receive sectors.

MIMO beamforming in a wireless network may be accomplished using RF beamforming and/or digital beamforming. In some embodiments, in performing a given MIMO transmission, user devices 1020 and/or AP(s) 1005 may be configured to use all or a subset of its one or more communications antennas to perform MIMO beamforming.

Any of the user devices 1020 (e.g., user devices 1024, 1026, 1028), and AP(s) 1005 may include any suitable radio and/or transceiver for transmitting and/or receiving radio frequency (RF) signals in the bandwidth and/or channels corresponding to the communications protocols utilized by any of the user device(s) 1020 and AP(s) 1005 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax, 802.11be), 5 GHz channels (e.g. 802.11n, 802.11ac, 802.11ax, 802.11be), 6 GHz (e.g., 802.11be), or 60 GHZ channels (e.g. 802.11ad, 802.11ay) or 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1A, AP 1005 may communicate a EHT PPDU 1042 comprising a beacon frame that includes a QoS management field. The QoS management field may, in some embodiments, comprise a single bit that is set to a value of 1 to indicate that the AP 1005 has QoS management capability for all links associated with the AP 1005.

The AP 1005 may address the beacon frame with a group address to broadcast the beacon frame to all stations (STAs) within range including the user devices 1020 via a single link such as a 6 GHz link. In other embodiments, the AP 1005 may transmit a QoS management field with a bit per feature of the QoS management capability. In still other embodiments, the AP 1005 may include a QoS disabled field in the management frame to indicate whether or not the QoS management capability is temporarily disabled and may set a single bit in the management frame to indicate that the QoS management capability is currently disabled. Note that the QoS management capability might be currently disabled for new and/or existing QoS negotiations due to congestion or interference with one or more of the links or TIDs associated with the AP 1005. Also, the QoS management capability might be currently disabled for new QoS negotiations for one or more links or TIDs because adding more traffic to one or more of the links may risk an inability to meet the QoS management capability requirements for the existing traffic.

The AP 1005 may communicate EHT PPDU 1042 comprising a beacon frame with one or more user devices 1020 by broadcasting the EHT PPDU 1042 on the 6 GHz link and the one or more user devices 1020 may determine that the QoS management capability is temporarily disabled based on the QoS disabled bit value in the beacon frame of the EHT PPDU 1042.

The one or more user devices 1020 may receive the EHT PPDU 1042, demodulate the EHT PPDU 1042, de-interleave the EHT PPDU 1042, decode the EHT PPDU 1042, determine a scrambler initialization bit sequence from the EHT PPDU, and descramble the MAC beacon frame from the data field of the EHT PPDU 1042.

The one or more user devices 1020 may pass the PSDU from the EHT PPDU 1042 to the MAC layer as an MSDU and baseband processing circuitry executing code for the MAC layer may deparse and interpret the MAC frame in the MSDU to determine how to proceed or respond in view of receipt of the EHT PPDU.

Based on receipt of the beacon frame, each of the user devices 1020 may determine to not to respond to the AP 1005 because the QoS management capability is disabled.

Figure 1B:
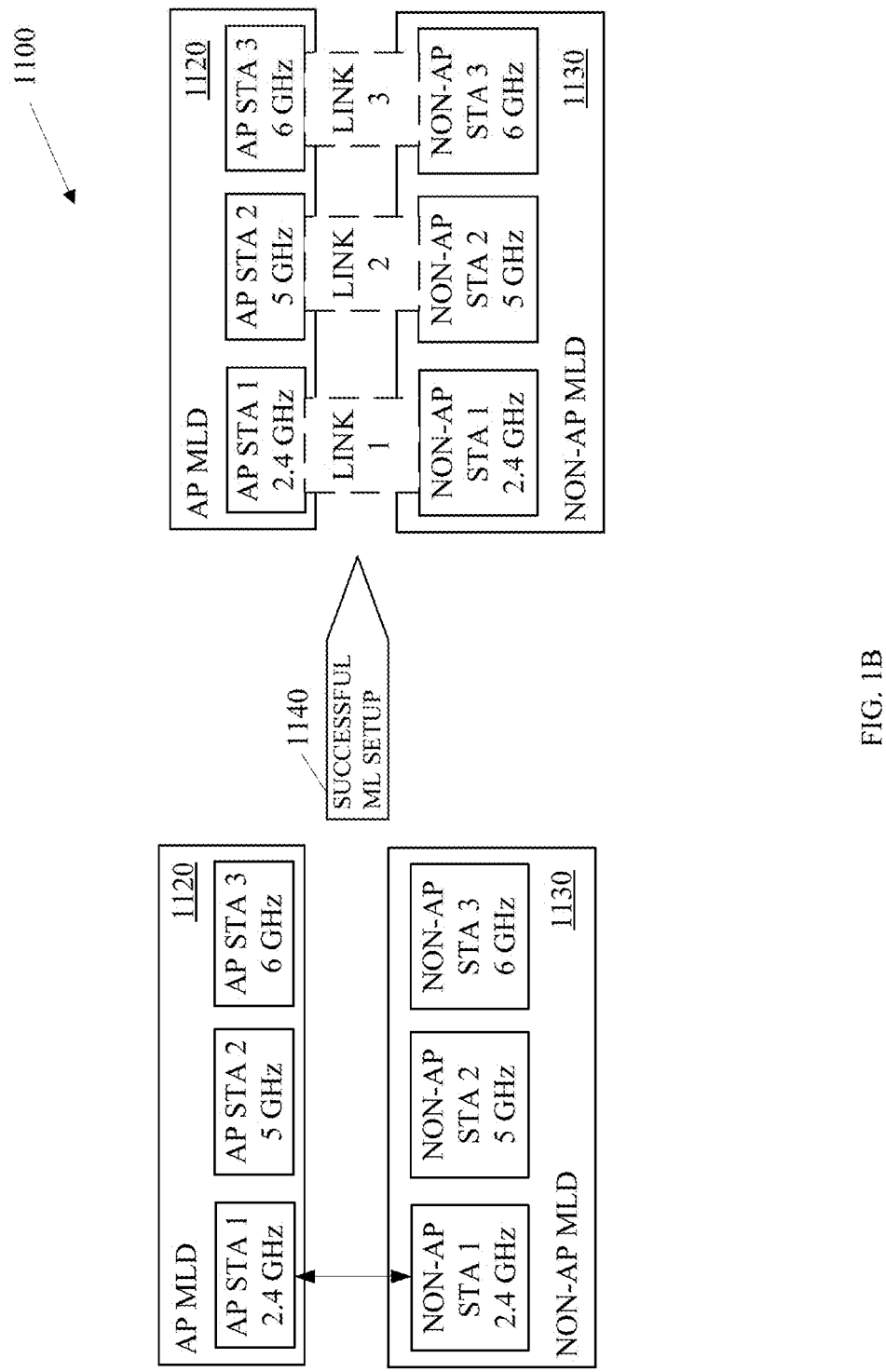
FIG. 1B depicts an embodiment illustrating interactions between stations (STAs) to establish multiple links between an access point (AP) multi-link device (MLD) and a non-AP MLD.

In FIG. 1B, the AP MLD 1120 has three affiliated APs: AP 1 operates on 2.4 GHz band, AP 2 operates on 5 GHz band, and AP 3 operates on 6 GHz band. The non-AP STA 1 affiliated with the non-AP MLD 1130 sends an association request frame (or a reassociation request frame) to AP 1 affiliated with the AP MLD 1120. The association request frame may have a TA field set to the MAC address of the non-AP STA 1 and an RA field set to the MAC address of the AP 1. The association request frame may include complete information of non-AP STA 1, non-AP STA 2, and non-AP STA 3 to request three links to be setup (one link between AP 1 and non-AP STA 1, one link between AP 2 and non-AP STA 2, and one link between AP 3 and non-AP STA 3) and an ML element that indicates the MLD MAC address of the non-AP MLD 1130.

Furthermore, the non-AP MLD 1130 may include detailed information about QoS management capability features that the non-AP MLD 1130 supports. The AP MLD 1120 may respond with an association response frame that includes detailed information about the QoS management capability features for each of the three links. In some embodiments, the AP MLD 1120 may include the detailed information in an element such as a multi-link attribute element, a reduced neighbor report element, a multiple BSSID element, a neighbor report element, or the like. In some embodiments, the AP MLD 1120 may also include signaling in the association response including support for advanced QoS capabilities enabling integration with 802.1 time-sensitive networking (TSN) standards, such as time-aware scheduling (802.1Qbv), and redundancy (802.1CB) in response to similar signaling from the non-AP MLD 1130 in the association request frame.

AP 1 affiliated with the AP MLD 1120 may send the association response frame to non-AP STA 1 affiliated with the non-AP MLD 1130 with a TA field of the association response frame is set to the MAC address of the AP 1 and an RA field of the association response frame set to the MAC address of the non-AP STA 1, to indicate successful multi-link setup 1140. The association response frame may include complete information of AP 1, AP 2, and AP 3 and an ML element that indicates the MLD MAC address of the AP MLD 1120. After successful ML setup between the non-AP MLD 1130 and the AP MLD 1120, three links are setup (LINK 1 between AP 1 and non-AP STA 1, LINK 2 between AP 2 and non-AP STA 2, and LINK 3 between AP 3 and non-AP STA 3).

In some embodiments, the non-AP MLD 1130 may associate with less than all the links available from the AP MLD 1120 for various reasons. For instance, in some embodiments, the non-AP MLD 1130 may only be capable of establishing two of the links. In some embodiments, the non-AP MLD 1130 may establish a link with a second AP MLD because the second AP MLD may have a better signal-to-noise ratio associated with one or more links and be associated with the same ESS. In some embodiments, the non-AP MLD 1130 may establish a link with a second AP MLD because the second AP MLD may be associated with a different ESS or a BSS that is not associated with the BSS of the AP MLD 1120.

Figure 1C:
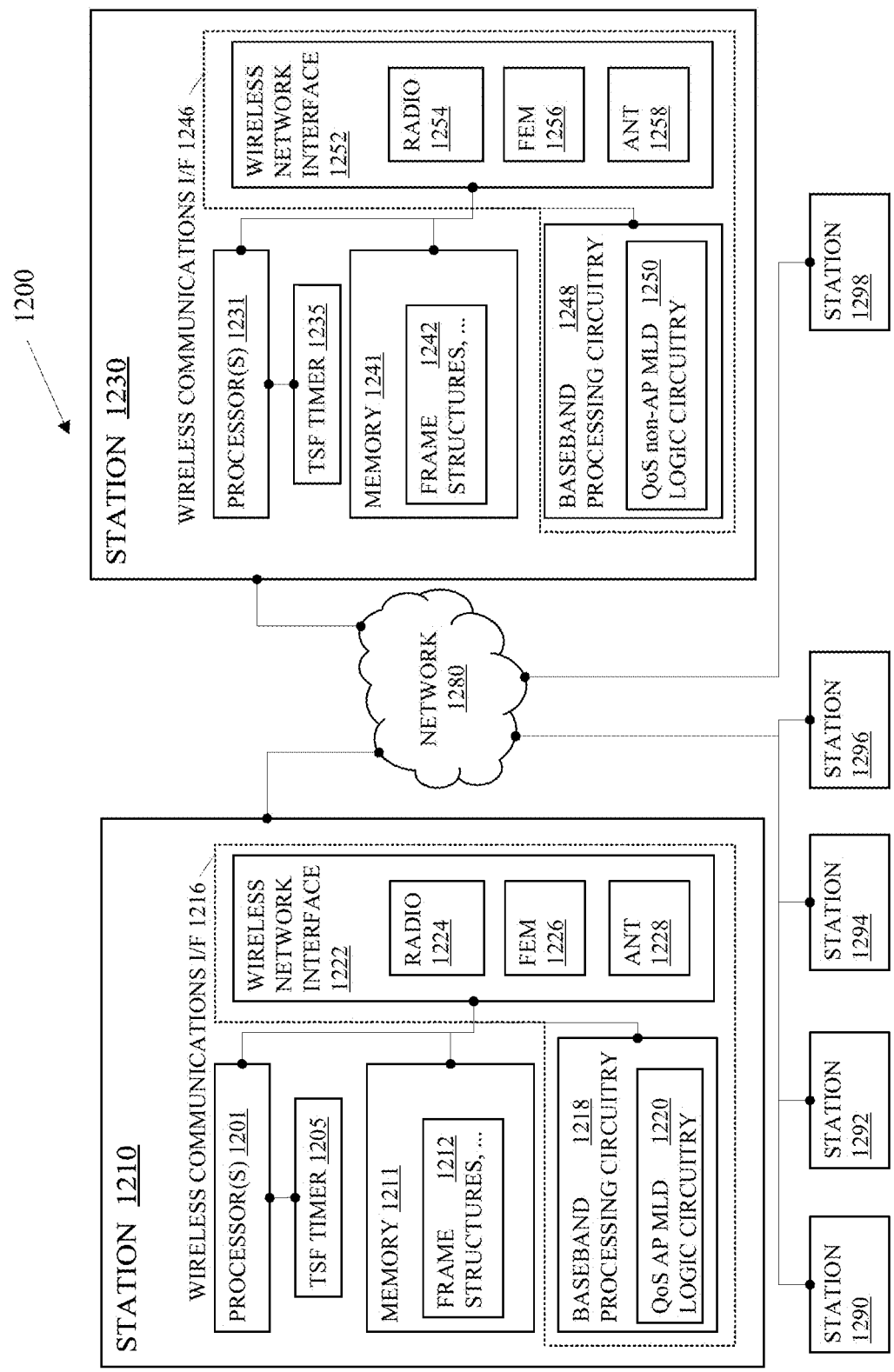
FIG. 1C depicts an embodiment of a system including multiple STAs to implement quality of service (QoS) management logic circuitry, in accordance with one or more example embodiments.

FIG. 1C depicts an embodiment of a system 1200 to transmit or receive as well as to generate, transmit, receive, decode, and interpret transmissions between an AP station 1210 and multiple STAs 1230, 1290, 1292, 1294, 1296, and 1298, associated with the AP station 1210. The AP STA 1210 may be wired and wirelessly connected to each of the STAs 1230, 1290, 1292, 1294, 1296, and 1298.

In some embodiments, the STAs 1210 and 1230 may include one or more computer systems similar to that of the example machines/systems of FIGS. 5, 6, 7, and 8.

Each STA 1230, 1290, 1292, 1294, 1296, and 1298 may associate with the AP STA 1210 via at least one link. After associating with the AP STA 1210, the AP STA 1210 may buffer data to downlink (DL) to the STAs 1230, 1290, 1292, 1294, 1296, and 1298 and each STA 1230, 1290, 1292, 1294, 1296, and 1298 may collect data to uplink (UL) to the AP STA 1210.

Periodically, the AP STA 1210 may transmit a beacon frame unicast to STA 1230 via a MAC data frame in a EHT PPDU addressed to the STA 1230 with the MAC address for STA 1230 on a 6 GHz link as the target transmitter address (TA). Note that if the STA 1230 is associated with the AP STA 1210 by more than on link, the STA 1230 and the AP 1210 may both have specific MAC or other addresses associated with each of the links. For instance, the STA 1230 may be associated with the AP STA 1210 via a 2.4 GHz link, a 5, GHz link, and a 6 GHz link. Thus, the TA for the STA 1230 may be a MAC address that is only associated with the 6 GHz link.

The beacon frame may include a QoS disabled field in an element in the frame body that indicates a status of the QoS management capability or of each feature thereof. In some situations, the AP STA 1210 may transmit the beacon frame with the QoS disabled field indicating that the QoS management capability is temporarily disabled. In some embodiments, QoS disabled field may comprise a single bit that either indicates that the QoS management capability is temporarily disabled or not. In other embodiments, the AP STA 1210 may transmit the beacon frame with the QoS disabled per feature field indicating specific features such as TIDs for which the QoS management capability is temporarily disabled or advanced QoS capabilities are temporarily disabled.

The AP STA 1210 may generate the EHT PPDU with the beacon frame and the baseband processing circuitry 1218 of the AP STA 1210 may pass the PSDU along with parameters for the EHT PPDU to the PHY. The PHY may transmit the EHT PPDU on a 320 MHz bandwidth of the EHT PPDU.

The AP STA 1210 comprise processor(s) 1201 and memory 1211. The processor(s) 1201 may comprise any data processing device such as a microprocessor, a microcontroller, a state machine, and/or the like, and may execute instructions or code in the memory 1211. The memory 1211 may comprise a storage medium such as Dynamic Random Access Memory (DRAM), read only memory (ROM), buffers, registers, cache, flash memory, hard disk drives, solid-state drives, or the like. The memory 1211 may store 1212 the frames, frame structures, frame headers, etc., and may also comprise code to generate, scramble, encode, decode, parse, and interpret MAC frames and/or PHY frames and PPDUs.

The baseband processing circuitry 1218 may comprise a baseband processor and/or one or more circuits to implement a station management entity. In some embodiments, the station management entity may interact with a MAC layer management entity to perform MAC layer functionality and a PHY management entity to perform PHY functionality. In such embodiments, the baseband processing circuitry 1218 may interact with processor(s) 1201 to coordinate higher layer functionality with MAC layer and PHY functionality.

In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211. In further embodiments, the MAC layer functionality may interface the processor(s) 1201.

The MAC logic functionality may communicate with the PHY to transmit a MAC frame such as a probe response frame in a PHY frame such as an EHT PPDU to the STA 1230. The MAC functionality may generate frames such as management, data, control frames, and extension frame as well as parameters by which the PHY may transmit the MAC frames.

The PHY may prepare the MAC frame for transmission by, e.g., determining a preamble to prepend to a MAC frame to create a PHY frame. The preamble may include one or more short training field (STF) values, long training field (LTF) values, and signal (SIG) field values. A wireless network interface 1222 or the baseband processing circuitry 1218 may prepare the PHY frame as a scrambled, encoded, modulated PPDU in the time domain signals for the radio 1224. Furthermore, the TSF timer 1205 may provide a timestamp value to indicate the time at which the PPDU is transmitted.

After processing the PHY frame, a radio 1225 may impress digital data onto subcarriers of RF frequencies for transmission by electromagnetic radiation via elements of an antenna array or antennas 1224 and via the network 1280 to a receiving STA such as the STA 1230.

The wireless network I/F 1222 also comprises a receiver. The receiver receives electromagnetic energy, extracts the digital data, and the analog PHY and/or the baseband processor 1218 decodes a PHY frame and a MAC frame from a PPDU.

The STA 1230 may receive the probe response frame in the EHT PPDU from the STA 1210 via the network 1280. The STA 1230 may comprise processor(s) 1231 and memory 1241. The processor(s) 1231 may comprise any data processing device such as a microprocessor, a microcontroller, a state machine, and/or the like, and may execute instructions or code in the memory 1241. The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, decode, parse, and interpret MAC frames and/or PHY frames and PPDUs.

The baseband processing circuitry 1248 may comprise a baseband processor and/or one or more circuits to implement a station management entity and the station management entity may interact with a MAC layer management entity to perform MAC layer functionality and a PHY management entity to perform PHY functionality. In such embodiments, the baseband processing circuitry 1248 may interact with processor(s) 1231 to coordinate higher layer functionality with MAC layer and PHY functionality.

In some embodiments, the baseband processing circuitry 1218 may interact with one or more analog devices to perform PHY functionality such as descrambling, decoding, demodulating, and the like. In other embodiments, the baseband processing circuitry 1218 may execute code to perform one or more of the PHY functionality such as descrambling, decoding, demodulating, and the like.

The STA 1230 may receive the EHT PPDU at the antennas 1258, which pass the signals along to the FEM 1256. The FEM 1256 may amplify and filter the signals and pass the signals to the radio 1254. The radio 1254 may filter the carrier signals from the signals and determine if the signals represent a PPDU. If so, analog circuitry of the wireless network I/F 1252 or physical layer functionality implemented in the baseband processing circuitry 1248 may demodulate, decode, descramble, etc. the PPDU. The baseband processing circuitry 1248 may identify, parse, and interpret the MAC probe response frame from the PSDU of the EHT PPDU.

Figure 1D:
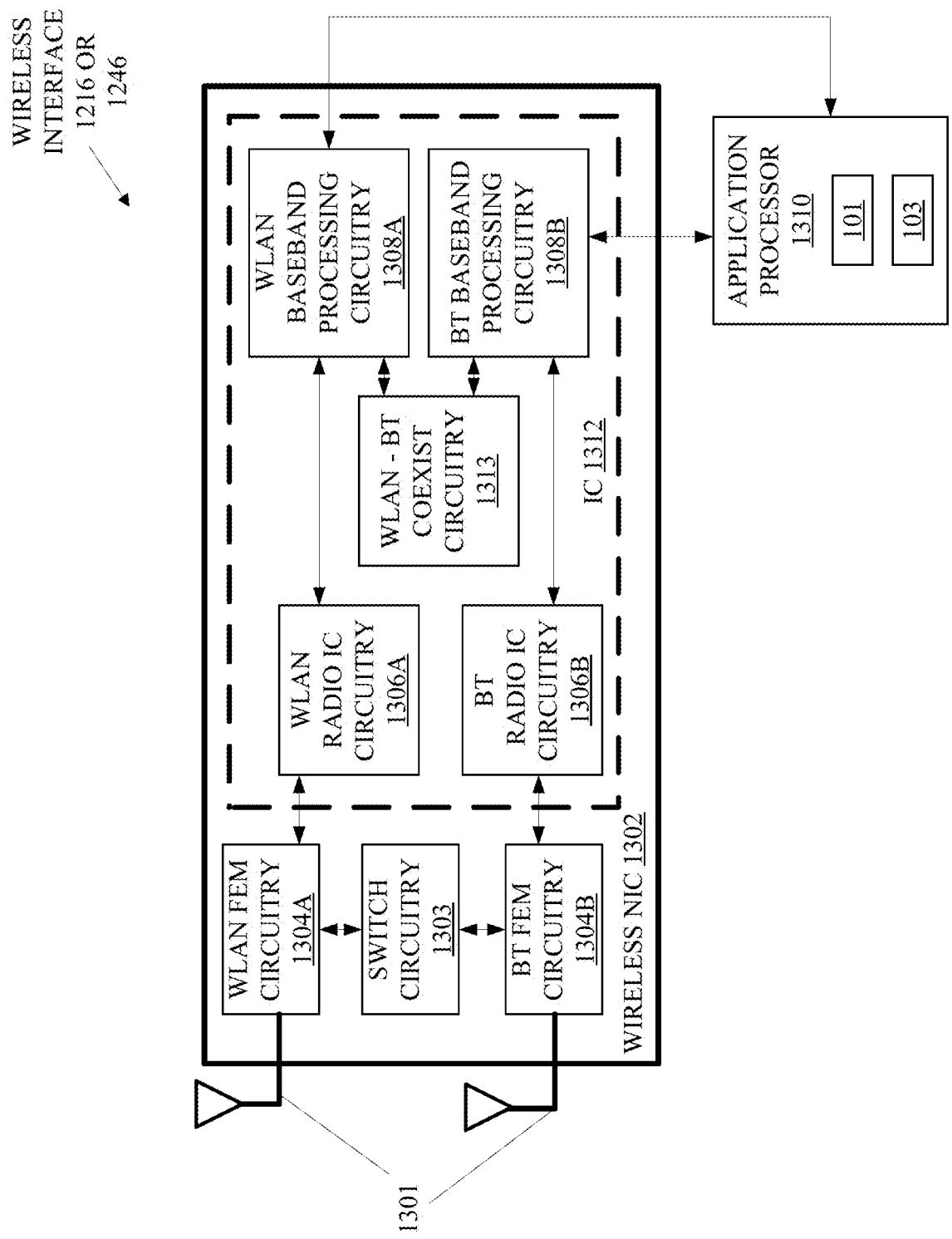
FIG. 1D illustrates an embodiment of a wireless interface for STAs, such as the STAs depicted in FIGS. 1A-C, to implement QoS management logic circuitry.

FIG. 1D is a block diagram of a radio architecture such as the wireless communications I/F 1216 and 1246 in accordance with some embodiments that may be implemented in any one of the example AP 100 and/or the example STA 102 of FIG. 1. Radio architecture 1216 and 1246 may include radio front-end module (FEM) circuitry 1304*a-b*, radio IC circuitry 1306*a-b* and baseband processing circuitry 1308*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304*a-b* may include a WLAN or Wi-Fi FEM circuitry 1304*a* and a Bluetooth (BT) FEM circuitry 1304*b*. The WLAN FEM circuitry 1304*a* may include a receive signal path comprising circuitry configured to operate on WLAN RF signals received from one or more antennas 1301, to amplify the received signals and to provide the amplified versions of the received signals to the WLAN radio IC circuitry 1306*a* for further processing. The BT FEM circuitry 1304*b* may include a receive signal path which may include circuitry configured to operate on BT RF signals received from one or more antennas 1301, to amplify the received signals and to provide the amplified versions of the received signals to the BT radio IC circuitry 1306b for further processing. FEM circuitry 1304a may also include a transmit signal path which may include circuitry configured to amplify WLAN signals provided by the radio IC circuitry 1306a for wireless transmission by one or more of the antennas 1301. In addition, FEM circuitry 1304b may also include a transmit signal path which may include circuitry configured to amplify BT signals provided by the radio IC circuitry 1306b for wireless transmission by the one or more antennas. In the embodiment of FIG. 1D, although FEM 1304a and FEM 1304b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306a-b as shown may include WLAN radio IC circuitry 1306a and BT radio IC circuitry 1306b. The WLAN radio IC circuitry 1306a may include a receive signal path which may include circuitry to down-convert WLAN RF signals received from the FEM circuitry 1304a and provide baseband signals to WLAN baseband processing circuitry 1308a. BT radio IC circuitry 1306b may in turn include a receive signal path which may include circuitry to down-convert BT RF signals received from the FEM circuitry 1304b and provide baseband signals to BT baseband processing circuitry 1308b. WLAN radio IC circuitry 1306a may also include a transmit signal path which may include circuitry to up-convert WLAN baseband signals provided by the WLAN baseband processing circuitry 1308a and provide WLAN RF output signals to the FEM circuitry 1304a for subsequent wireless transmission by the one or more antennas 1301. BT radio IC circuitry 1306b may also include a transmit signal path which may include circuitry to up-convert BT baseband signals provided by the BT baseband processing circuitry 1308b and provide BT RF output signals to the FEM circuitry 1304b for subsequent wireless transmission by the one or more antennas 1301. In the embodiment of FIG. 1D, although radio IC circuitries 1306a and 1306b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1308a-b may include a WLAN baseband processing circuitry 1308a and a BT baseband processing circuitry 1308b. The WLAN baseband processing circuitry 1308a may include a memory, such as, for example, a set of RAM arrays in a Fast Fourier Transform or Inverse Fast Fourier Transform block (not shown) of the WLAN baseband processing circuitry 1308a. Each of the WLAN baseband circuitry 1308a and the BT baseband circuitry 1308b may further include one or more processors and control logic to process the signals received from the corresponding WLAN or BT receive signal path of the radio IC circuitry 1306a-b, and to also generate corresponding WLAN or BT baseband signals for the transmit signal path of the radio IC circuitry 1306a-b. Each of the baseband processing circuitries 1308a and 1308b may further include physical layer (PHY) and medium access control layer (MAC) circuitry, and may further interface with a device for generation and processing of the baseband signals and for controlling operations of the radio IC circuitry 1306a-b.

Referring still to FIG. 1D, according to the shown embodiment, WLAN-BT coexistence circuitry 1313 may include logic providing an interface between the WLAN baseband circuitry 1308a and the BT baseband circuitry 1308b to enable use cases requiring WLAN and BT coexistence. In addition, a switch circuitry 1303 may be provided between the WLAN FEM circuitry 1304a and the BT FEM circuitry 1304b to allow switching between the WLAN and BT radios according to application needs. In addition, although the antennas 1301 are depicted as being respectively connected to the WLAN FEM circuitry 1304a and the BT FEM circuitry 1304b, embodiments include within their scope the sharing of one or more antennas as between the WLAN and BT FEMs, or the provision of more than one antenna connected to each of FEM 1304a or 1304b.

In some embodiments, the front-end module circuitry 1304a-b, the radio IC circuitry 1306a-b, and baseband processing circuitry 1308a-b may be provided on a single radio card, such as wireless network interface card (NIC) 1302. In some other embodiments, the one or more antennas 1301, the FEM circuitry 1304a-b and the radio IC circuitry 1306a-b may be provided on a single radio card. In some other embodiments, the radio IC circuitry 1306a-b and the baseband processing circuitry 1308a-b may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1216 and 1246 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1216 and 1246 may be part of a Wi-Fi communication station (STA) such as a wireless access point (AP), a base station or a mobile device including a Wi-Fi device. In some of these embodiments, radio architecture 1216 and 1246 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2020, 802.11ay, 802.11ba, 802.11ax, and/or 802.11be standards and/or proposed specifications for WLANs, although the scope of embodiments is not limited in this respect. Radio architecture 1216 and 1246 may also be suitable to transmit and/or receive communications in accordance with other techniques and standards.

In some embodiments, the radio architecture 1216 and 1246 may be configured for high-efficiency Wi-Fi (HEW) communications in accordance with the IEEE 802.11ax standard. In these embodiments, the radio architecture 1216 and 1246 may be configured to communicate in accordance with an OFDMA technique, although the scope of the embodiments is not limited in this respect.

In some other embodiments, the radio architecture 1216 and 1246 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1D, the BT baseband circuitry 1308*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 1216 and 1246 may include other radio cards, such as a cellular radio card configured for cellular (e.g., 5GPP such as LTE, LTE-Advanced or 7G communications).

In some IEEE 802.11 embodiments, the radio architecture 1216 and 1246 may be configured for communication over various channel bandwidths including bandwidths having center frequencies of about 2.4 GHz, 5 GHz, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHz, 80 MHz, 160 MHz, 240 MHz, and 320 MHz. The scope of the embodiments is not limited with respect to the above center frequencies however.

Figure 1E:
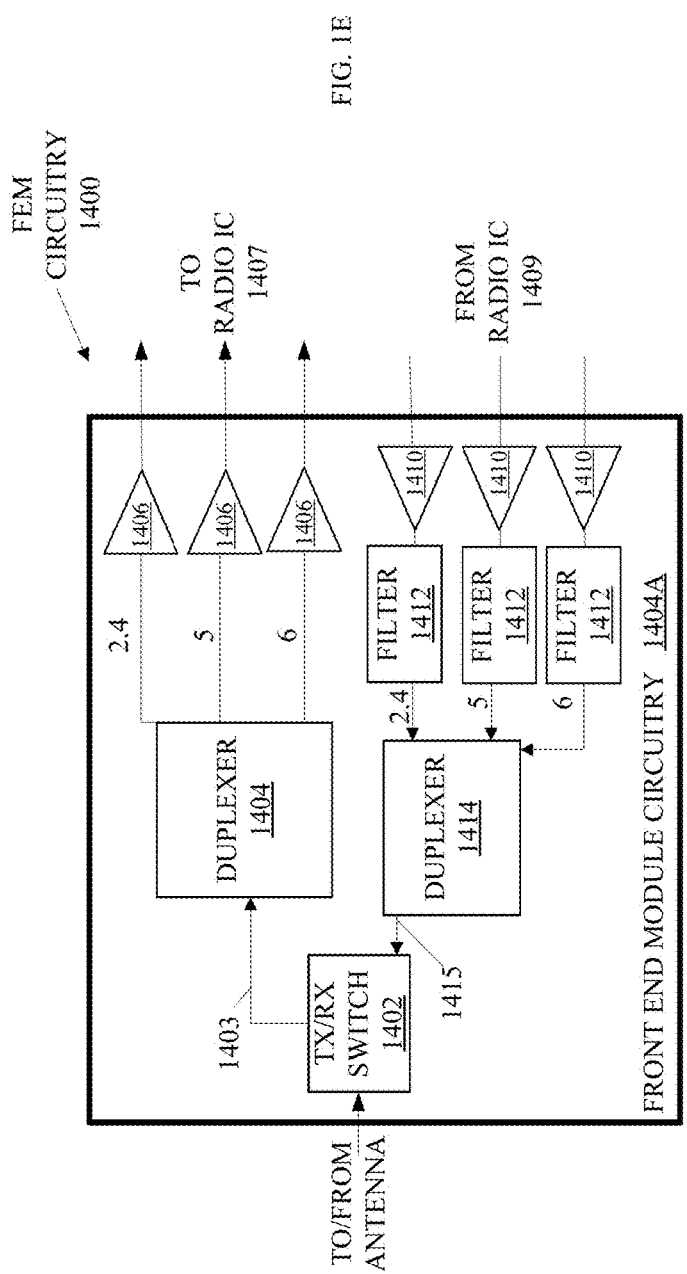
FIG. 1E illustrates an embodiment of front end module (FEM) circuitry of a wireless interface for STAs, such as the STAs in FIGS. 1A-C, to implement QoS management logic circuitry.

FIG. 1E illustrates WLAN FEM circuitry 1304*a* in accordance with some embodiments. Although the example of FIG. 1E is described in conjunction with the WLAN FEM circuitry 1304*a*, the example of FIG. 1E may be described in conjunction with other configurations of BT FEM circuitry.

In some embodiments, the FEM circuitry 1304*a* may include a TX/RX switch 1402 to switch between transmit mode and receive mode operation. The FEM circuitry 1304*a* may include a receive signal path and a transmit signal path. The receive signal path of the FEM circuitry 1304*a* may include a low-noise amplifier (LNA) 1406 to amplify received RF signals 1403 and provide the amplified received RF signals 1407 as an output (e.g., to the radio IC circuitry 1306*a-b* (FIG. 1D)). The transmit signal path of the circuitry 1304*a* may include a power amplifier (PA) to amplify input RF signals 1409 (e.g., provided by the radio IC circuitry 1306*a-b*), and one or more filters 1412, such as band-pass filters (BPFs), low-pass filters (LPFs) or other types of filters, to generate RF signals 1415 for subsequent transmission (e.g., by one or more of the antennas 1301 (FIG. 1D)) via an example duplexer 1414.

In some dual-mode embodiments for Wi-Fi communication, the FEM circuitry 1304*a* may be configured to operate in the 2.4 GHz frequency spectrum, the 5 GHz frequency spectrum, or the 6 GHz frequency spectrum. In these embodiments, the receive signal path of the FEM circuitry 1304*a* may include a receive signal path duplexer 1404 to separate the signals from each spectrum as well as provide a separate LNA 1406 for each spectrum as shown. In these embodiments, the transmit signal path of the FEM circuitry 1304*a* may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1D). In some embodiments, BT communications may utilize the 2.4 GHz signal paths and may utilize the same FEM circuitry 1304*a* as the one used for WLAN communications.

Figure 1F:
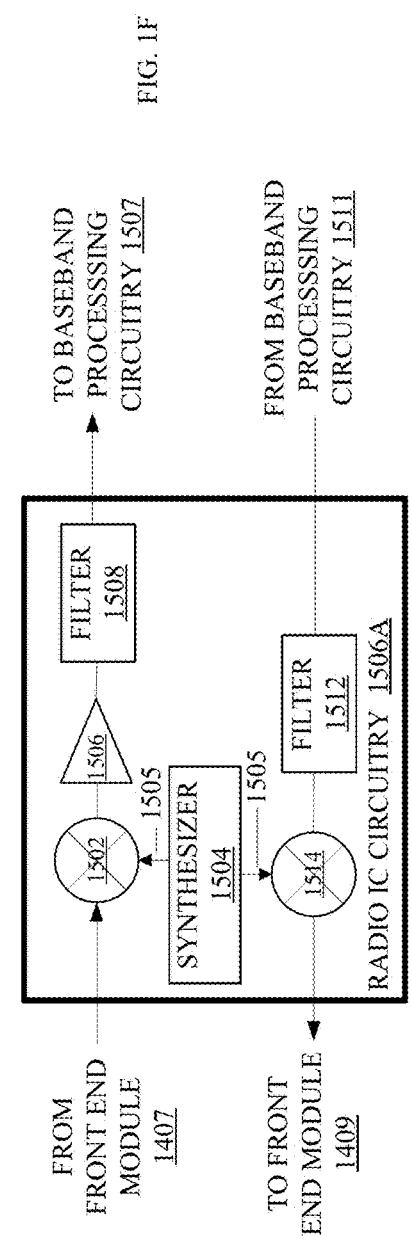
FIG. 1F illustrates an embodiment of radio integrated circuit (IC) circuitry of a wireless interface for STAs, such as the STAs in FIGS. 1A-C, to implement QoS management logic circuitry.

FIG. 1F illustrates radio IC circuitry 1306*a* in accordance with some embodiments. The radio IC circuitry 1306*a* is one example of circuitry that may be suitable for use as the WLAN or BT radio IC circuitry 1306*a*/1306*b* (FIG. 1D), although other circuitry configurations may also be suitable. Alternatively, the example of FIG. IF may be described in conjunction with the example BT radio IC circuitry 1306*b*.

In some embodiments, the radio IC circuitry 1306*a* may include a receive signal path and a transmit signal path. The receive signal path of the radio IC circuitry 1306*a* may include at least mixer circuitry 1502, such as, for example, down-conversion mixer circuitry, amplifier circuitry 1506 and filter circuitry 1508. The transmit signal path of the radio IC circuitry 1306*a* may include at least filter circuitry 1512 and mixer circuitry 1514, such as, for example, upconversion mixer circuitry. Radio IC circuitry 1306*a* may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1F illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304*a-b* (FIG. 1D) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308*a-b* (FIG. 1D) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304*a-b*. The baseband signals 1511 may be provided by the baseband processing circuitry 1308*a-b* and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or upconversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct upconversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1F may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1F). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 1E) may comprise a balanced signal, although the scope of the embodiments is not limited in this respect. The I and Q baseband output signals may be provided to low-noise amplifier, such as amplifier circuitry 1506 (FIG. 1F) or to filter circuitry 1508 (FIG. 1F).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1504 may be provided by a voltage controlled oscillator (VCO), although that is not a requirement. A divider control input may further be provided by either the baseband processing circuitry 1308*a-b* (FIG. 1D) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

Figure 1G:
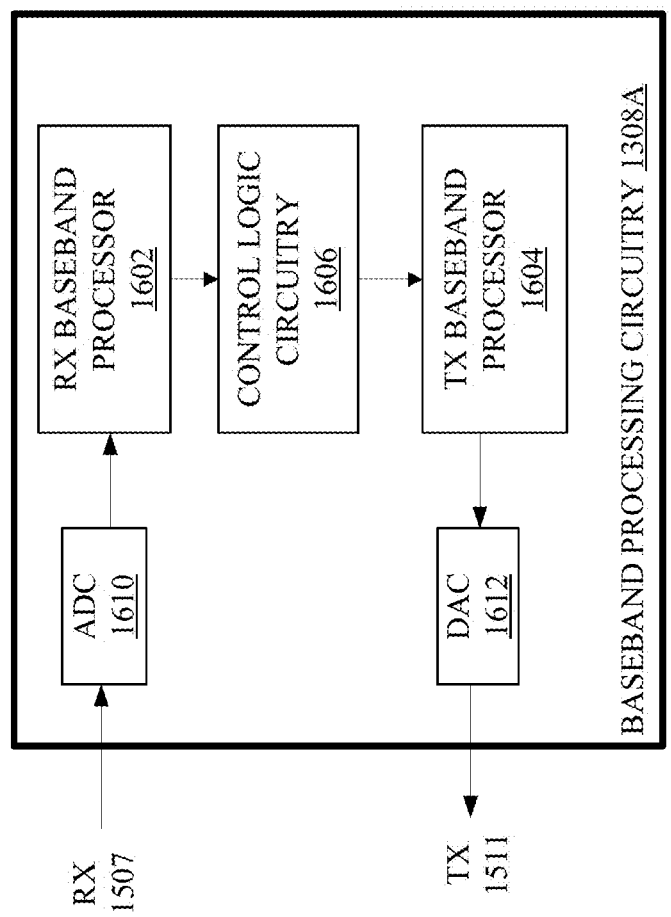
FIG. 1G illustrates an embodiment of baseband processing circuitry of a wireless interface for STAs, such as the STAs in FIGS. 1A-C, to implement QoS management logic circuitry.

FIG. 1G illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 1D), although other circuitry configurations may also be suitable. Alternatively, the example of FIG. 1F may be used to implement the example BT baseband processing circuitry 1308*b* of FIG. 1D.

The baseband processing circuitry 1308*a* may include a receive baseband processor (RX BBP) 1602 for processing receive baseband signals 1509 provided by the radio IC circuitry 1306*a-b* (FIG. 1D) and a transmit baseband processor (TX BBP) 1604 for generating transmit baseband signals 1511 for the radio IC circuitry 1306*a-b*. The baseband processing circuitry 1308*a* may also include control logic 1606 for coordinating the operations of the baseband processing circuitry 1308*a*.

In some embodiments (e.g., when analog baseband signals are exchanged between the baseband processing circuitry 1308*a-b* and the radio IC circuitry 1306*a-b*), the baseband processing circuitry 1308*a* may include ADC 1610 to convert analog baseband signals 1609 received from the radio IC circuitry 1306*a-b* to digital baseband signals for processing by the RX BBP 1602. In these embodiments, the baseband processing circuitry 1308*a* may also include DAC 1612 to convert digital baseband signals from the TX BBP 1604 to analog baseband signals 1611.

In some embodiments that communicate OFDM signals or OFDMA signals, such as through baseband processor 1308*a*, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1D, in some embodiments, the antennas 1301 (FIG. 1D) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1216 and 1246 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Figure 2A:
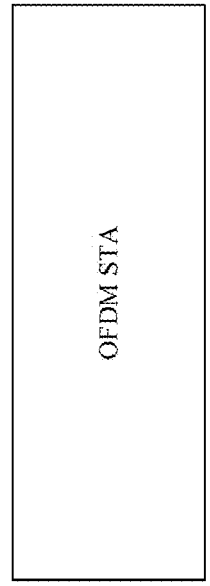
FIG. 2A depicts an embodiment of transmissions between four stations and an AP.
Figure 2B:
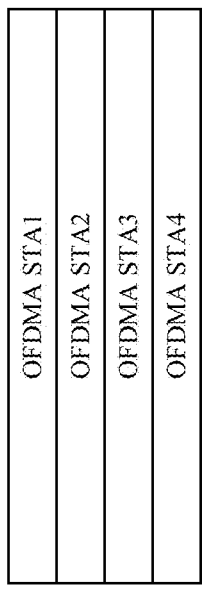
FIG. 2B depicts an embodiment of a transmission between one station and an AP.
Figure 2C:
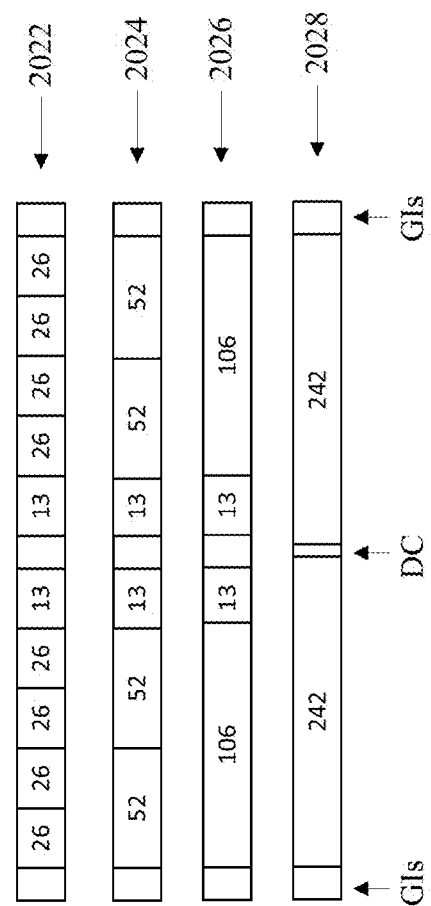
FIG. 2C depicts an embodiment of a resource units in a 20 megahertz (MHz) bandwidth.

FIGS. 2A-2C illustrate embodiments of channels and subchannels (or resource units) that can facilitate multiple transmissions simultaneously along with transmission of an OFDMA PPDU and can facilitate a single user (SU) with transmission of an orthogonal frequency multiplexer (OFDM) PPDU. Note that OFDM transmissions are examples of non-OFDMA transmissions. Note also that the RUs shown in FIG. 2C are illustrative of the functionality even though the RUs associated with the 320 MHz EHT PPDUs herein are larger RUs.

FIG. 2A illustrates an embodiment of transmissions 2010 between four stations and an AP on four different subchannels (or RUs) of a channel via OFDMA. Grouping subcarriers into groups of resource units is referred to as subchannelization. Subchannelization defines subchannels that can be allocated to stations depending on their channel conditions and service requirements. An OFDMA system may also allocate different transmit powers to different subchannels.

In the present embodiment, the OFDMA STA1, OFDMA STA2, OFDMA STA3, and OFDMA STA4 may represent transmissions on a four different subchannels of the channel. For instance, transmissions 2010 may represent an 80 MHz channel with four 20 MHz bandwidth PPDUs using frequency division multiple access (FDMA). Such embodiments may include, e.g., 1 PPDU per 20 MHz bandwidth, 2 PPDU in a 40 MHz bandwidth, and 4 PPDUs in an 80 MHz bandwidth. As a comparison, FIG. 2B illustrates an embodiment of an orthogonal frequency division multiplexing (OFDM) transmission 2015 for the same channel as FIG. 2A. The OFDM transmission 2015 may use the entire channel bandwidth.

FIG. 2C illustrates an embodiment of a 20 Megahertz (MHz) bandwidth 2020 on a channel that illustrates different resource unit (RU) configurations 2022, 2024, 2026, and 2028. In OFDMA, for instance, an OFDM symbol is constructed of subcarriers, the number of which is a function of the PPDU (also referred to as the PHY frame) bandwidth. There are several subcarrier types: 1) Data subcarriers which are used for data transmission; 2) Pilot subcarriers which are utilized for phase information and parameter tracking; and 3) unused subcarriers which are not used for data/pilot transmission. The unused subcarriers are the direct current (DC) subcarrier, the Guard band subcarriers at the band edges, and the Null subcarriers.

The RU configuration 2022 illustrates an embodiment of nine RUs that each include 26 tones (or subcarriers) for data transmission including the two sets of 13 tones on either side of the DC. The RU configuration 2024 illustrates the same bandwidth divided into 5 RUs including four RUs with 52 tones and one RU with 26 tones about the DC for data transmission. The RU configuration 2026 illustrates the same bandwidth divided into 3 RUs including two RUs with 106 tones and one RU with 26 tones about the DC for data transmission. And the RU configuration 2028 illustrates the same bandwidth divided into 2 RUs including two RUs with 242 tones about the DC for data transmission. Embodiments may be capable of additional or alternative bandwidths such as such as 40 MHz, 80 MHz, 160 MHz, 240 MHz, and 320 MHz.

Many embodiments support RUs of 26-tone RU, 52-tone RU, 106-tone RU, 242-tone RU, 484-tone RU, 996-tone RU, 2×996-tone RU, and 4×996-tone RU. In some embodiments, RUs that are the same size or larger than 242-tone RUs are defined as large size RUs and RUs that are smaller than 242-tones RUs are defined as small size RUs. In some embodiments, small size RUs can only be combined with small size RUs to form small size MIRUs. In some embodiments, large size RUs can only be combined with large size RUs to form large size MIRUs.

FIG. 2D illustrates an embodiment of a EHT PPDU 2100 in the form of an 802.11, multi-user, orthogonal frequency division multiple access (OFDMA) packet that is capable of multiple transmissions on different RUs of a 320 MHz channel. In some embodiments, the baseband processing circuitry, such as the baseband processing circuitry 1218 in FIG. 1C, may transmit an MU OFDMA transmission that multiplexes, e.g., IEEE 802.11be or 802.11ax transmissions on the same carrier frequency (e.g., 2.4 GHz, 5 GHz, or 6 GHz) within the same MU OFDMA packet. In other words, the PHY transmits multiple different packets on different RUs or frequency sub-bands within the wideband channel simultaneously. In some embodiments, the EHT PPDU 2100 may comprise an MU-RTS trigger frame to identify a transmission opportunity (TxOP) for the target STAs or initiate a beamforming procedure for the target STAs.

In some embodiments, the EHT PPDU 2100 may comprise a non-OFDMA transmission (such as an OFDM transmission) and may only transmit a single, e.g., 240 MHz transmission on an MRU that is a combination of less than all of the RUs shown. Note that while all RUs shown in EHT PPDU are 484 tone RUs (40 MHz), other EHT PPDUs may use combinations of different size RUs such as combinations of one or more of 484-tone RUs, 996-tone RUs, and 2×996-tone RUs, and 4×996-tone RUs that comprise up to 320 MHz.

The EHT PPDU 2100 may comprise a legacy preamble 2110 to notify other devices in the vicinity of the source STA, such as an AP STA, that the 320 MHz channel is in use for a duration included in the legacy preamble 2110. The EHT PPDU 2100 may also comprise an EHT preamble 2120 to identify a subsequent EHT transmission as well as the one or more STAs that are the target(s) of an SU/MU transmission. After the EHT preamble 2120, the EHT PPDU 2100 may comprise a data portion that includes service fields 2130 and PSDUs in one or more of the RUs 1-8.

The service fields 2130 may include a scrambler initialization bit sequence such as an 11 bit scrambler initialization bit sequence used for scrambling the data portion 2140. The source STA may use the scrambler initialization bit sequence to scramble the data portion of the RU of the EHT PPDU 2100 after the service field to inform the target STA how to descramble the data portion.

The data portion 2140 may include PSDUs addressed to the target STAs such as a PHY header with an RTS frame addressed to individual addresses or group addresses of the target STAs.

FIGS. 2E-F illustrate PPDU formats of EHT PPDU 2200. In FIGS. 2E-F, the EHT PPDU 2200 may be part of an MU PPDU such as the EHT PPDU 2100 shown in FIG. 2D. The EHT PPDU 2200 format is used for a DL transmission to one or more STAs if the PPDU is not a response to a triggering frame. In the EHT PPDU 2200, the EHT-SIG field is present.

As illustrated in FIG. 2F, the data field of the EHT PPDU 2200 may comprise a service field followed by a MAC frame 2210. The service field may include 2 octets (16 bits) and may comprise a scrambler initialization bit sequence used by the transmitting STA to scramble the remainder of the data field.

The remainder of the data field of the EHT PPDU 2200 may comprise an MPDU such as a MAC RTS frame. The MAC RTS frame may include a 2 octet frame control field, a 2 octet duration field, a 6 octet receiver address (RA) field, a 6 octet transmitter address (TA) field, and a 4 octet frame check sequence field comprising a value, such as a 32-bit cyclic redundancy code (CRC), to check the validity of and/or correct preceding frame.

The RA field of the RTS frame may comprise the address of the STA that is the intended immediate recipient of a pending individually addressed frame. The TA field may comprise the address of the STA transmitting the RTS frame or the bandwidth signaling TA of the STA transmitting the RTS frame. In other embodiments, the TA field may be a bandwidth signaling TA.

For all RTS frames sent by non-QoS STAs, the Duration field is the time, in microseconds, required to transmit the pending Data or Management frame, plus one CTS frame, plus one Ack frame, plus three SIFSs. If the calculated duration includes a fractional microsecond, that value is rounded up to the next higher integer.

For RTS frames sent by QoS STAs, in transmissions under EDCA by a STA that initiates a TXOP, there are two classes of duration settings: single protection and multiple protection. In single protection, the Duration field of the frame can set a network allocation vector (NAV) value at receiving STAs that protects up to the end of any following Data, Management, or response frame plus any additional overhead frames. In multiple protection, the Duration field of the frame can set a NAV that protects up to the estimated end of a sequence of multiple frames.

FIG. 2G illustrates an embodiment of a management frame 2200 generated by baseband processing logic circuitry such as the MAC sublayer logic 1218 and 1248 in FIG. 1C. In other embodiments, the frame 2200 may have more or less fields, different fields, and/or fields with different field lengths. In the embodiment illustrated in FIG. 2G, the frame 2200 comprises a MAC header 2201 followed by a frame body field 2224 and a frame check sequence (FCS) field 2226.

The MAC header 2201 may comprise the frame control field 2202, a duration/identifier (DUR/ID) field 2212, an address (ADDR) field 2214, an ADDR field 2216, an ADDR field 2218, a Sequence Control (SEQ CTL) field 2220, an optional fourth ADDR field, and a high throughput control (HT CTL) field 2225. The frame control field 2202 may be two octets such as the standard frame and may identify the type and subtype of the frame such as a control type and ready to send (RTS) subtype.

The frame control field 2202 may comprise a protocol version field 2204, a type field 2206, a subtype field 2207, a TO DS field 2208, a FROM DS field 2209, and other frame control bits 2210. The protocol version field 2204 may be two bits in length (B0-B1). The value of the protocol version field 2204 may represent the revision of the corresponding standard that the frame represents. The type field 2206 may be two bits in length (B2-B3) and may identify the type of frame 2200 as, e.g., a management frame, a data frame, or a control frame. The subtype field 2207 may be four bits in length (B4-B7) and may identify the subtype of the frame 2200 as, e.g., a particular type of management frame, data frame, or control frame.

The TO DS field 2208 and the FROM DS field 2209 may be one bit in length each (B8-B9) and may identify information about the origin and/or destination of the frame. For instance, in some embodiments, if the value in the TO DS field 2208 is a logical zero and the value in the FROM DS field 2209 is a logical zero, the transmission may comprise a data frame transmitted direct from one station (STA) to another STA within the same independent basic service set (IBSS), a data frame transmitted direct from one non-AP STA to another non-AP STA within the same basic service set (BSS), or a management or control frame. If the value in the TO DS field 2208 is a logical one and the value in the FROM DS field 2209 is a logical zero, the transmission may comprise a data frame destined for the DS or being sent by a STA associated with an AP to the Port Access Entity in that AP. If the value in the TO DS field 2208 is a logical zero and the value in the FROM DS field 2209 is a logical one, the transmission may comprise a data frame exiting the DS or being sent by the Port Access Entity in an AP. And if the value in the TO DS field 2208 is a logical one and the value in the FROM DS field 2209 is a logical one, the transmission may comprise a data frame using the four-address format.

After the TO DS field 2208 and the FROM DS field 2209 may be an other bits field 2210 may further be used for additional frame control field parameters such as more fragments, retry, power management, more data, and protected frame fields. The frame control field 2202 may further comprise a +HTC subfield 2211 that is set to 1 in a QoS Data or Management frame transmitted with the FORMAT parameter of the TXVECTOR set to HT_GF, HT_MF, VHT or S1G to indicate that the frame contains an HT CTL field 2225. The +HTC field 2211 is also set to 1 in a QoS Data or Management frame transmitted by a CMMG STA to indicate that the frame contains a CMMG variant HT CTL field 2225.

The duration/identifier (DUR/ID) field 2212 may be 16 bits (2 octets) in length. The contents of this field vary with frame type and subtype, with whether the frame is transmitted during the CFP, and with the QoS capabilities of the sending STA such as the communications device 1030. When the contents of a received Duration/ID field, treated as an unsigned integer and without regard for address values, type, and subtype (even when type or subtype contain reserved values), are less than 32 768, the duration value is used to update the network allocation vector (NAV).

The Address fields 2214, 2216, and 2218 may be used to indicate the basic service set identification (BSSID), source address (SA), destination address (DA), transmitting STA address (TA), and receiving STA address (RA). Certain frames may not contain some of the address fields. Each Address field may contain a 48-bit (6 octet) address.

One or more of the fields ADDR 2216, ADDR 2218, Sequence Control 2220, ADDR 2222, and frame body 2224 may only be present in certain frame types and subtypes of the frames. In many embodiments, however, the Sequence Control 2220 may be present in frames generated for packet flows.

The Sequence Control field 2220 is 16 bits, or 2 octets, in length and may comprise two subfields, the Sequence Number and the Fragment Number. The Sequence Number field may be a 12-bit field indicating the sequence number of an MSDU or Management Protocol Data Unit (MMPDU). STAs may assign a sequence number to each MSDU or MMPDU transmitted.

The Fragment Number field may be a 4-bit field indicating the number of each fragment of an MSDU or MMPDU. The fragment number may be set to 0 in the first or only fragment of an MSDU or MMPDU and may be incremented by one for each successive fragment of that MSDU or MMPDU. The fragment number may remain constant in all retransmissions of the fragment.

The frame body field 2226 may comprise one or more elements. The frame body 2226 may be 20 octets and may include data elements, control elements, or parameters and capabilities including some duplicative or constant bit sequences that will repeat across a number of frames generated for transmission in a packet flow. The FCS field 2228 may be four octets and may include extra checksum characters added to the frame 2200 for error detection and correction such as a cyclic redundancy check value. In some embodiment, the FCS field 2228 contains a 32-bit CRC. The FCS field 2228 value is calculated over all of the fields of the MAC header 2201 and the Frame Body field 2226.

In FIG. 2H illustrates an embodiment of an element 2300. The element may comprise an information element that can be included in a frame body of a management frame such as the frame body 2226 of the management frame 2200. For instance, if the management frame is a beacon frame, QoS AP MLD logic circuitry of an AP such as the QoS AP MLD logic circuitry 1220 (FIG. 1C) may include an element 2300, such as a multi-link attribute element, in the frame body of the beacon frame to advertise QoS AP MLD capabilities. In some embodiments, the QoS AP MLD logic circuitry may advertise basic QoS management capability functionality in a frame such as a beacon frame that is broadcast to STAs and then provide more detailed QoS functionality information in a response such as a probe response addressed to an individual STA. In further embodiments, the QoS AP MLD logic circuitry may advertise detailed QoS functionality information in a beacon frame also.

The element 2300 may include the basic QoS functionality in the information field, for example of a multi-link attribute element and the basic information may include, e.g., a single QoS management bit 2326 that is, e.g., set to a logical 1 to indicate that the QoS AP MLD logic circuitry 1220 support QoS MLD capabilities across links associated with the AP in which the QoS AP MLD logic circuitry resides as shown in the information field 2340 in FIG. 2I. FIGS. 2I, 2J, 2K, and 2L illustrate alternative embodiments of the information field 2325 in the element 2300. FIG. 2I illustrates an information field 2340 that includes the QoS management bit 2326 to indicate the presence or absence of QoS capabilities by the AP in all links supported by the AP with a single bit value.

FIG. 2J illustrates an information field 2350 that includes the QoS management bit 2326 as well as a QoS disable bit 2328. The QoS disable bit 2328 includes a single bit value to indicate whether or not, one or more of the QoS capabilities are temporarily disabled for any of the links supported by the AP. The QoS disable bit 2328 may include a bit set to 1 when the QoS capabilities are disabled on one or more or all links associated with the AP and set to 0 to indicate that the QoS capabilities are not disabled on one or more or all links associated with the AP. In an alternative embodiment, the information field 2325 may include a QoS disable bit 2328 set to the bit value of 1 to indicate that the QoS is enabled on one or more or all links.

FIG. 2K illustrates an information field 2360 that includes the QoS management per link field 2330. The QoS management per link field 2330 may include two or more bits to indicate the presence or absence of QoS capabilities by the AP in each of the links supported by the AP individually. For example, in one embodiment, the QoS management per link field 2330 may include a bit per link such as one bit for the 2.4 GHz link, one bit for the 5 GHz link, and one bit for the 6 GHz link associated with the AP. The one bit for the 2.4 GHz link may be set to 1 to indicate presence of the QoS functionality for the 2.4 GHz link. Similarly, the one bit for the 5 GHz link may be set to 1 to indicate presence of the QoS functionality for the 5 GHz link and the one bit for the 6 GHz link may be set to 1 to indicate presence of the QoS functionality for the 6 GHz link. In other embodiments, a two bit pattern or other bit pattern may indicate the presence or absence of the QoS functionality for the three links.

FIG. 2L illustrates an information field 2370 that includes the QoS management per link field 2330 as well as a QoS disable per feature field 2332. The QoS disable per feature field 2332 may include a bit value for each feature to indicate whether or not, each feature of the QoS management capability is temporarily disabled for any of the links supported by the AP.

The AP may be capable of establishing multiple links with STAs including a 2.4 GHz link, a 5 GHz link, and a 6 GHz link. By including the element 2300 as a multiple link attribute element in the beacon frame and by setting the QoS management bit 2326 to 1 (FIG. 2I), the AP can advertise QoS capabilities by including, advantageously, a single bit value to the element 2300.

The element 2300 may include an element ID field 2310, a length field 2315, an optional element ID extension 2320, and the information field 2325. The element ID 2310 may identify the element as, e.g., a multi-link attribute element, an EHT operations element, reduced neighbor report element, a neighbor report element, a multiple BSSID element, a different element, or the like.

The length field 2315 may provide a value that is the number of octets in the element 2300 excluding the element ID field 2310 and the length field 2315. In other embodiments, the length field 2315 may have a length defined in a different manner.

The element ID extension field 2320 is present in some elements and not present in other elements. If the element ID extension field 2320 is present, the value identifies an extension appended to the element 2300. For example, the AP may transmit a probe response to a STA in response to a probe request received from the STA that requests more information about the QoS capabilities of the AP. The probe response may include an element 2300 with the element ID extension field 2320 value set to, e.g., 1001, to indicate an extension appended to the element 2300. The extension may include a length field to indicate the length of the extension if the length is variable or may not include a length field if the length of the extension is not variable.

In some embodiments, the extension may also include an information field that includes at least one bit for multiple QoS management capability features. If the bit is set to, e.g., 1, the corresponding capability is supported for each link that the AP supports. If the bit is zero, the AP indicates that the corresponding capability is not supported each link. In other embodiments, the extension may include bits to indicate which link the QoS capabilities are supported on, if any.

The information field 2325 has different names and can include more than one field in different versions of the element 2300. For instance, an EHT operation element has the same fields as the element 2300 but the information field 2325 is named as EHT information field.

The EHT information field may comprise channel configuration information for the 6 GHz link associated with the AP and may contain subfields including channel width and channel center frequency segment (CCFS) information for a 20, 40, 80, 160, or 320 MHz EHT basic service set (BSS). In some embodiments, the EHT operation information may include the QoS disable field 2326 with a bit having a value set to 0 or 1 to indicate if the QoS capabilities of the AP are temporarily disabled or are not disabled. In further embodiments, the EHT operation information may include the QoS disable filed 2326 and the QoS management bit 2326.

In FIG. 2M illustrates an embodiment of a MAC frame exchange diagram 2400 that shows interactions between an AP MLD 1, an AP MLD 2, and a non-AP MLD. The AP MLD 1 begins with transmission of a beacon frame 2410 including a QoS management field with a single bit value of 0 that indicates that AP MLD 1 does not support QoS management capability. At time 2420, the non-AP MLD receives the beacon 2410 but does not respond because the beacon frame indicates that the AP MLD 1 does not support QoS management capability. Note that the MAC frames are transmitted in PPDUs.

The AP MLD 2 transmits a beacon 2430 that comprises a QoS management field that indicates that AP MLD 2 supports QoS management capability. In response, the non-AP MLD transmits a multi-link (ML) probe request 2440. The ML probe request 2440 may include detailed information about the multiple links and QoS management capability features supported by the non-AP MLD.

The AP MLD 2 responds to the non-AP MLD with an ML probe response that includes information about links 1-3 as well as a QoS management per link field to indicate that AP STA 1 on link 1 does not support QoS management capability, AP STA 2 on link 2 does support QoS management capability, and AP STA 3 on link 3 does support QoS management capability. Thereafter, the non-AP MLD transmits a ML setup request frame or an association request frame to the AP MLD 2 to associate with the AP MLD 2.

In FIG. 2N illustrates an embodiment of a MAC frame exchange diagram 2500 that shows interactions between an AP MLD 1, an AP MLD 2, and a non-AP MLD. The AP MLD 1 begins with transmission of a beacon frame 2510 including a QoS management field with a single bit value of 1 that indicates that AP MLD 1 does support QoS management capability but also includes a QoS disabled field with a single bit set to 1 to indicate that the AP MLD 1 temporarily disabled the QoS management capability for new and/or existing QoS negotiations. At time 2520, the non-AP MLD receives the beacon 2510 but does not respond because the beacon frame indicates that the AP MLD 1 temporarily does not support QoS management capability. Note that the MAC frames are transmitted in PPDUs.

The AP MLD 2 transmits a beacon 2530 that comprises a QoS management field that indicates that AP MLD 2 supports QoS management capability and with a QoS disabled field with a bit set to 0 to indicate that the QoS management capability is not temporarily disabled. In response, the non-AP MLD transmits a multi-link (ML) probe request 2540. The ML probe request 2540 may include detailed information about the multiple links and QoS management capability features supported by the non-AP MLD.

The AP MLD 2 responds to the non-AP MLD with an ML probe response 2550 that includes information about links 1-3 as well as a QoS management per link field to indicate that AP STA 1 on link 1 does not support QoS management capability, AP STA 2 on link 2 does support QoS management capability, and AP STA 3 on link 3 does support QoS management capability. Thereafter, the non-AP MLD transmits a ML setup request frame or an association request frame to the AP MLD 2 to associate with the AP MLD 2.

FIG. 3 depicts an embodiment of an apparatus to generate, transmit, receive, and interpret or decode PHY frames and MAC frames. In some embodiments, the apparatus may also include support for transmitting and/or receiving a wake-up radio packet (WUP) such as the wireless communications I/F of the wake-up radio (WUR) described in IEEE 802.11ba D8.0. The apparatus comprises a transceiver 3000 coupled with baseband processing circuitry 3001. The baseband processing circuitry 3001 may comprise a MAC logic circuitry 3091 and PHY logic circuitry 3092. In other embodiments, the baseband processing circuitry 3001 may be included on the transceiver 3000.

The MAC logic circuitry 3091 and PHY logic circuitry 3092 may comprise code executing on processing circuitry of a baseband processing circuitry 3001; circuitry to implement operations of functionality of the MAC or PHY; or a combination of both. The MAC logic circuitry 3091 may determine a frame such as a CTS frame and the PHY logic circuitry 3092 may determine the physical layer protocol data unit (PPDU) by prepending the frame, also called a MAC protocol data unit (MPDU), with a preamble to cause the antenna array 3018 to transmit.

The transceiver 3000 comprises a receiver 3004 and a transmitter 3006. Embodiments have many different combinations of modules to process data because the configurations are deployment specific. FIG. 3 illustrates some of the modules that are common to many embodiments. In some embodiments, one or more of the modules may be implemented in circuitry separate from the baseband processing circuitry 3001. In some embodiments, the baseband processing circuitry 3001 may execute code in processing circuitry of the baseband processing circuitry 3001 to implement one or more of the modules.

In the present embodiment, the transceiver 3000 also includes WUR circuitry 3110 and 3120. The WUR circuitry 3110 may comprise circuitry to use portions of the transmitter 3006 (a transmitter of the wireless communications I/F) to generate a WUR packet. For instance, the WUR circuitry 3110 may generate, e.g., an OOK signal with OFDM symbols to generate a WUR packet for transmission via the antenna array 3018. In other embodiments, the WUR may comprise an independent circuitry that does not use portions of the transmitter 3006.

Note that a station such as the STA 1210 in FIG. 1C may comprise multiple transmitters to facilitate concurrent transmissions on multiple contiguous and/or non-contiguous carrier frequencies.

The transmitter 3006 may comprise one or more of or all the modules including an encoder 3008, a stream deparser 3066, a frequency segment parser 3007, an interleaver 3009, a modulator 3010, a frequency segment deparser 3060, an OFDM 3012, an Inverse Fast Fourier Transform (IFFT) module 3015, a GI module 3045, and a transmitter front end 3040. The encoder 3008 of transmitter 3006 receives and encodes a data stream destined for transmission from the MAC logic circuitry 3091 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 320 MHz. Other embodiments may continue to process the frequency segments as separate data streams for, e.g. a non-contiguous 160+160 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the radio 3042 to convert the time domain signals into radio signals by combining the time domain signals with subcarrier frequencies to output into the transmitter front end module (TX FEM) 3040. The transmitter front end 3040 may comprise a with a power amplifier (PA) 3044 to amplify the signal and prepare the signal for transmission via the antenna array 3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end module (RX FEM) 3050 to detect the signal, detect the start of the packet, remove the carrier frequency, and amplify the subcarriers via a low noise amplifier (LNA) 3054 to output to the radio 3052. The radio 3052 may convert the radio signals into time domain signals to output to the GI module 3055 by removing the subcarrier frequencies from each tone of the radio signals.

The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals or may deparse the frequency segments determined by the optional frequency segment parser 3062. The decoder 3026 decodes the data from the demodulator 3024 and transmits the decoded information, the MPDU, to the MAC logic circuitry 3091.

The MAC logic circuitry 3091 may parse the MPDU based upon a format defined in the communications device for a frame to determine the particular type of frame by determining the type value and the subtype value. The MAC logic circuitry 3091 may then interpret the remainder of MPDU.

While the description of FIG. 3 focuses primarily on a single spatial stream system for simplicity, many embodiments are capable of multiple spatial stream transmissions and use parallel data processing paths for multiple spatial streams from the PHY logic circuitry 3092 through to transmission. Further embodiments may include the use of multiple encoders to afford implementation flexibility.

Figure 4B:
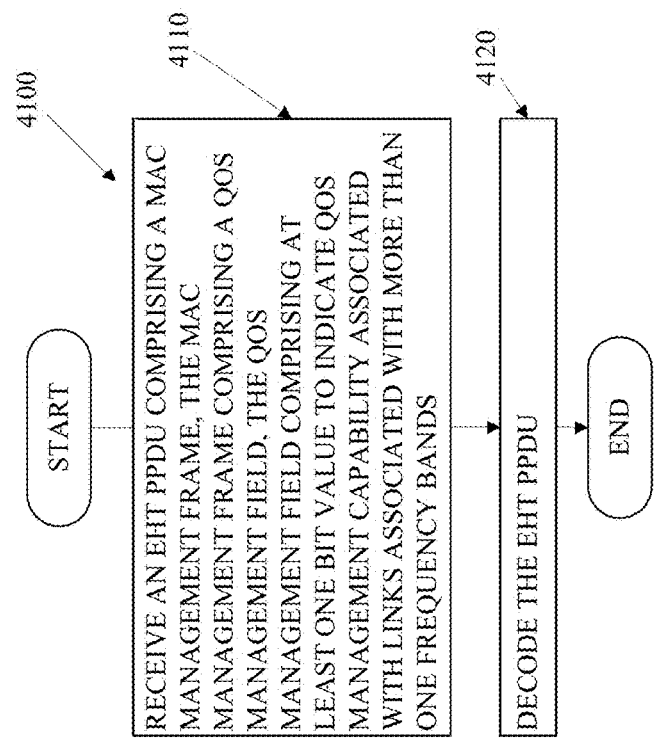
FIGS. 4A-B depict embodiments of flowcharts to generate, transmit, receive, and decode a EHT PPDU.
Figure 4A:
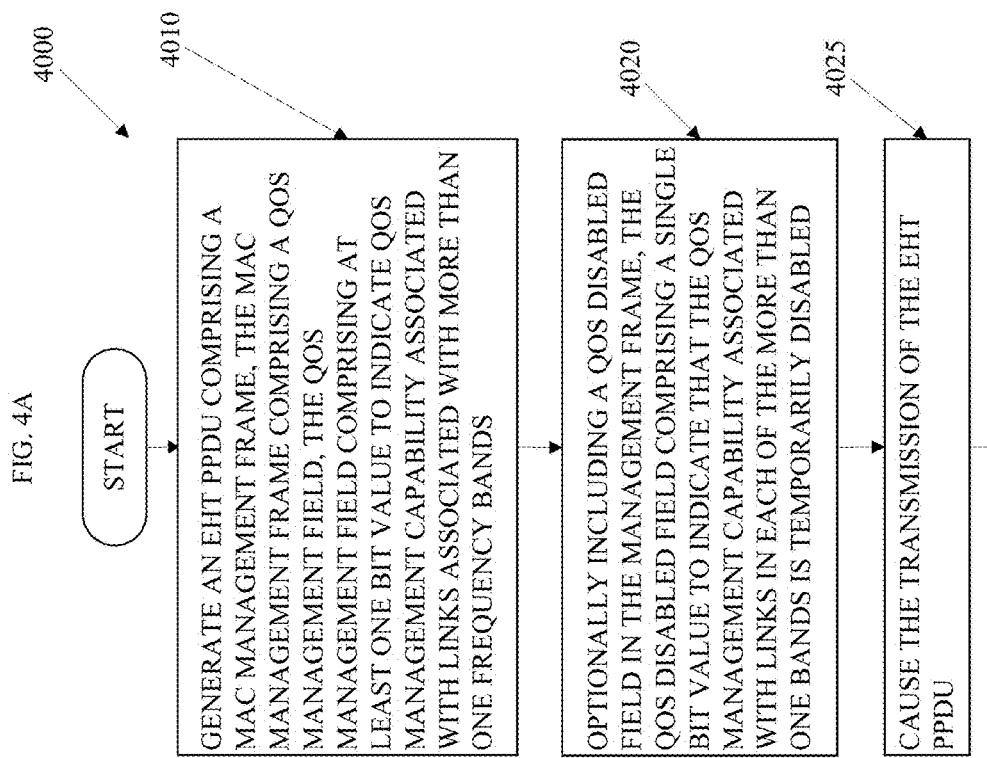

FIG. 4A illustrates an embodiment of a flowchart 4000 for generation and transmission of an EHT PPDU. At element 4010, a STA (e.g., the user device(s) 1020 and/or the AP 1005 of FIG. 1A) may generate an EHT PPDU that may comprise an element such as the element 2300 in FIG H. In some embodiments, the element may comprise a QoS management field to indicate whether or not the STA has QoS management capability. In some embodiments, the QoS management field may comprise a single bit value to indicate that the STA has the capability by setting the single bit to 1 or that the STA does not have the capability by setting the bit to zero, or vice versa. In some embodiments, the MAC management frame further comprises a QoS disabled field, the QoS disabled field comprising a single bit value to indicate that the QoS management capability associated with links in each of the more than one frequency bands is temporarily disabled (element 4025).

After generation of the non-OFDMA EHT PPDU, the PHY or baseband processing circuitry may cause the EHT PPDU to be transmitted to another station (element 4025).

FIG. 4B illustrates an embodiment of a flowchart 4100 for generation and transmission of a non-OFDMA 320 MHz EHT PPDU. At element 4110, a STA (e.g., the user device(s) 1020 and/or the AP 1005 of FIG. 1A) may receive an EHT PPDU that may comprise the management field that includes the QoS management field. In some embodiments, QoS management field has one bit set to 0 to indicate that the STA does not have the QoS management capability. In other embodiments, the QoS management field may comprise a single bit value set to 1 to indicate that the STA has the QoS management capability. In such embodiments, the management field that may also include a QoS disabled field set to 1 to indicate that the QoS management capability is unavailable or set to 0 to indicate that the QoS management capability is available.

After reception of the EHT PPDU, the PHY, MAC layer, and/or baseband processing circuitry may decode the EHT PPDU (element 4120) to interpret the content of the management frame.

Referring to FIG. 4C, illustrates an embodiment of a flowchart 4200 for generation and transmission of an EHT PPDU. At element 4210, a STA (e.g., the user device(s) 1020 and/or the AP 1005 of FIG. 1A) may generate an EHT PPDU, comprising a probe request frame, wherein the probe request frame information about QoS management capability features that the STA supports such as the ability to transmit and receive data frames, support for BAs and BA sizes, such as 256 MPDUs and 1024 MPDUs, for one or more of TIDs 8-15; BA sizes such as 256 medium access control (MAC) protocol data units (MPDUs) and 1024 MPDUs; and negotiation of QoS management capability features. In some embodiments, the STA may include support for QoS management capability including support for baseline QoS negotiation mechanisms (e.g., MSCS, SRQ) valid across the entire AP MLD and not just valid in the link in which the AP MLD negotiated QoS management support with non-AP MLD. In some embodiments, the STA may include capability for QoS management support including support of advanced QoS capabilities for enabling TSN integration (e.g. time-aware scheduling, redundancy).

After generation of the EHT PPDU, the PHY or baseband processing circuitry may cause the EHT PPDU to be transmitted to an AP (element 4220).

Referring to FIG. 4D, illustrates an embodiment of a flowchart 4300 for generation and transmission of a OFDMA 320 MHz EHT PPDU. At element 4310, a STA (e.g., the user device(s) 1020 and/or the AP 1005 of FIG. 1A) may generate an EHT PPDU comprising an association request frame responsive to receipt of a probe response frame, wherein the association request frame comprises detailed information about support by the STA for QoS management capability features described in the probe response frame to negotiate the QoS capability features.

After reception of the EHT PPDU, the PHY, MAC layer, and/or baseband processing circuitry may decode the EHT PPDU (element 4320).

Figure 4F:
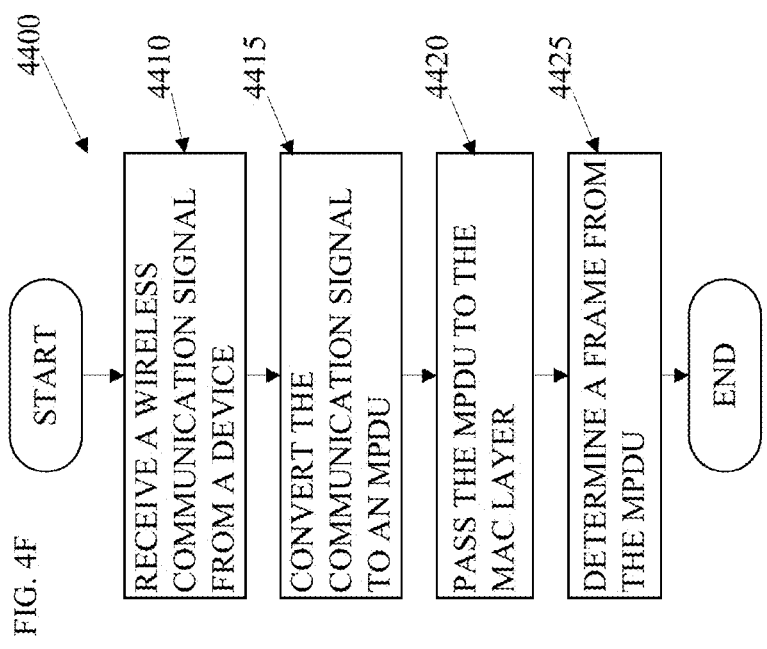
FIGS. 4E-F depict embodiments of flowcharts to generate and transmit frames and receive and interpret frames for communications between wireless communication devices.
Figure 4E:
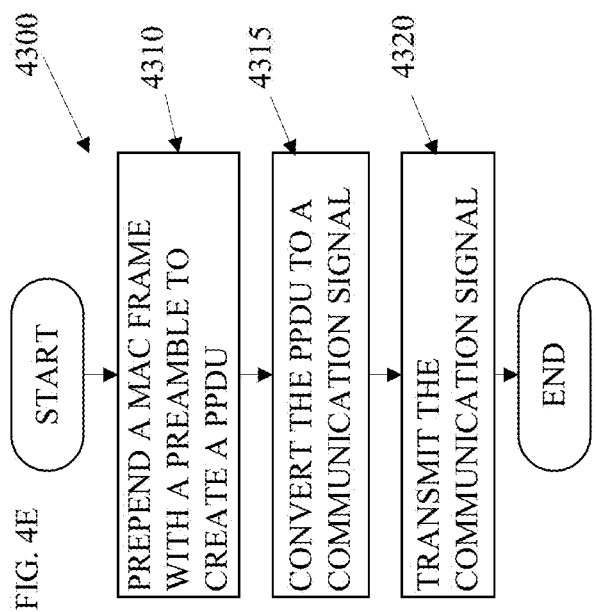

FIGS. 4E-F depict embodiments of flowcharts 4400 and 4500 to transmit, receive, and interpret communications with a frame. Referring to FIG. 4E, the flowchart 4300 may begin with the baseband processing circuitry or the PHY analog circuitry may encode and transform the PPDU into OFDM symbols for transmission to the STA 1210. The baseband processing circuitry or the PHY analog circuitry may generate a preamble to prepend the PHY service data unit (PSDU) (the MPDU) to form a PHY protocol data unit (PPDU) for transmission (element 4310).

In other embodiments, the baseband processing circuitry or the PHY analog circuitry may scramble the data field of the PPDU, excluding the service field, for transmission to the STA 1210.

The physical layer device such as the transmitter 3006 in FIG. 3 or the wireless network interfaces 1222 and 1252 in FIG. 1A may convert the PPDU to a communication signal via a radio (element 4315). The transmitter may then transmit the communication signal via the antenna coupled with the radio (element 4320).

Referring to FIG. 4F, the flowchart 4500 begins with a receiver of a device such as the receiver 3004 in FIG. 3 receiving a communication signal via one or more antenna(s) such as an antenna element of antenna array 3018 (element 4510). The receiver may convert the communication signal into an MPDU in accordance with the process described in the preamble (element 4515). More specifically, the received signal is fed from the one or more antennas to a DBF such as the DBF 220. The DBF transforms the antenna signals into information signals. The output of the DBF is fed to OFDM such as the OFDM 3022 in FIG. 3. The OFDM extracts signal information from the plurality of subcarriers onto which information-bearing signals are modulated. Then, the demodulator such as the demodulator 3024 demodulates the signal information via, e.g., BPSK, 16-QAM (quadrature amplitude modulation), 64-QAM, 256-QAM, 1024-QAM, or 4096-QAM with a forward error correction (FEC) coding rate (½, ⅔, ¾, or ⅚). And the decoder such as the decoder 3026 decodes the signal information from the demodulator via, e.g., BCC or LDPC, to extract the MPDU and pass or communicate the MPDU to MAC layer such as MAC logic circuitry 3091 (element 4520).

The MAC layer may determine frame field values from the MPDU (element 4525) such as the control frame fields in the RTS frame shown in FIG. 2F. For instance, the MAC layer may determine frame field values such as the type and subtype field values of the RTS frame. The MAC layer may determine that the MPDU comprises a RTS frame so the MAC layer may generate a CTS frame in response if the sub-band of the channel is clear in accordance with the EDCA procedures.

Figure 5:
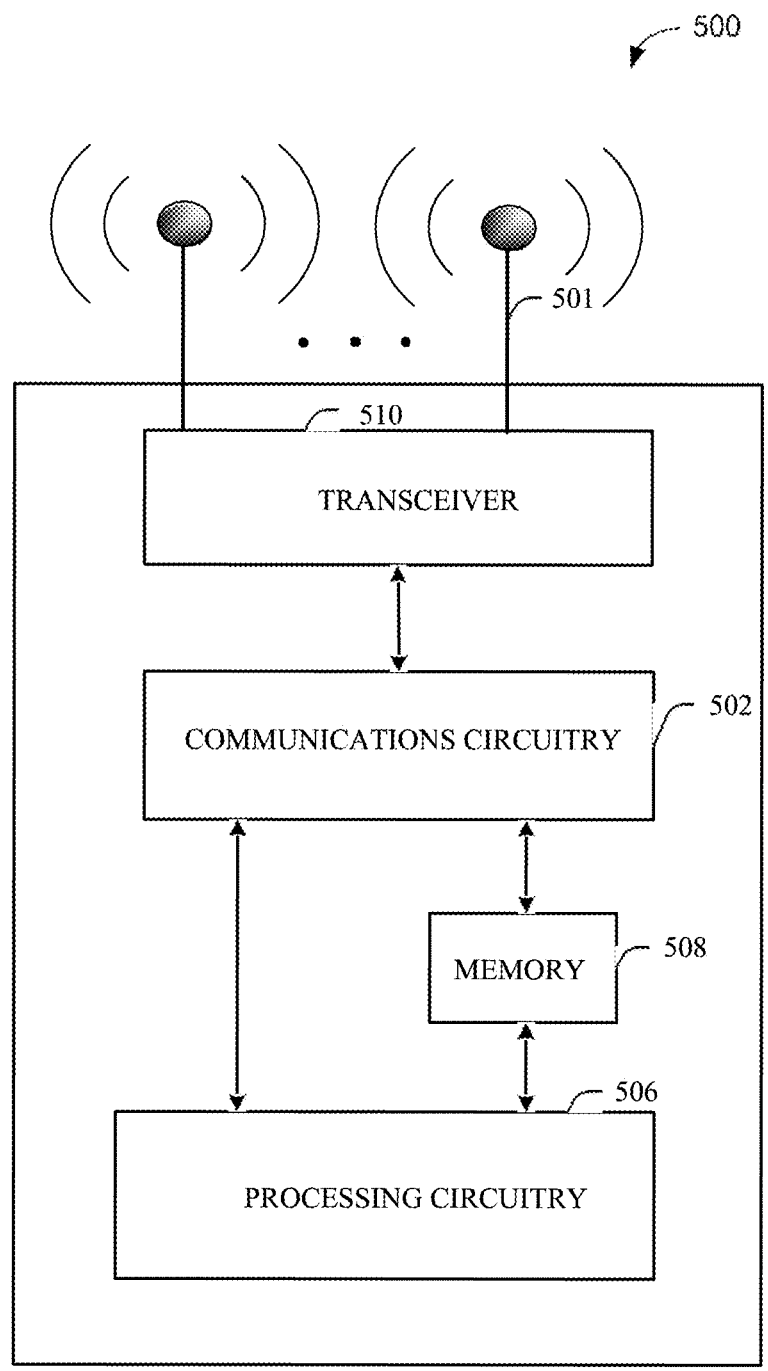
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a communication station that may be suitable for use as an AP 1005 (FIG. 1A) or a user device 1028 (FIG. 1A) in accordance with some embodiments. The communication station 500 may also be suitable for use as other user device(s) 1020 such as the user devices 1024 and/or 1026. The user devices 1024 and/or 1026 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
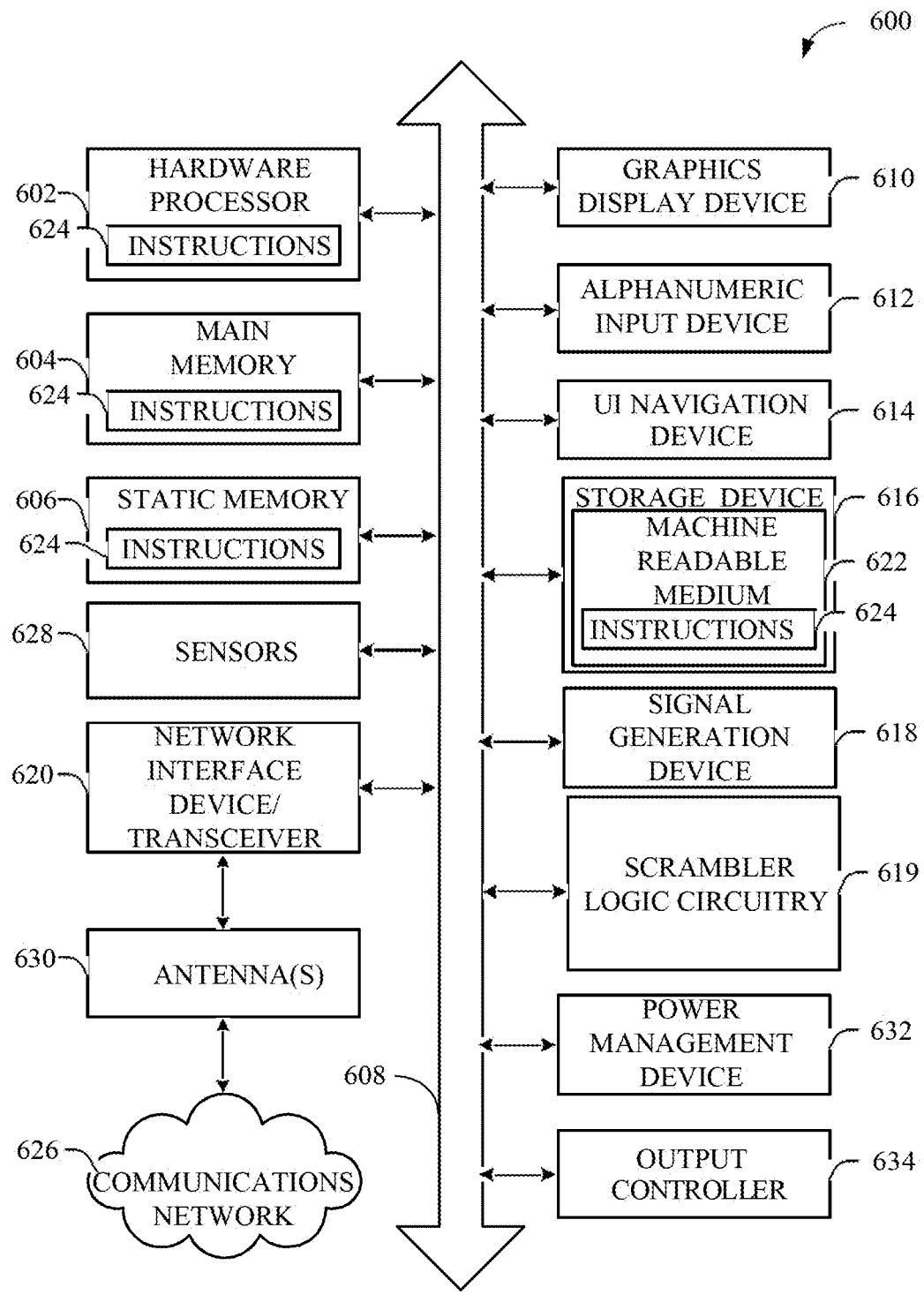
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP such as the AP 1005 and/or one of the user devices 1020 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a QoS management logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the QoS management logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The QoS management logic circuitry 619 may carry out or perform any of the operations and processes (e.g., flowcharts 4000, 4100, 4200, and 4300 shown in FIGS. 4A-D, respectively) described and shown above. For instance, the QoS management logic circuitry may generate an EHT PPDU comprising a management frame to advertise QoS management capability. The QoS management for MLDs refers to MLO in terms of stream/flow identification of such real-time applications, corresponding traffic classification belonging to traffic identifiers (TIDs) 8-15, and prioritized channel access. An AP MLD with QoS management logic circuitry 619 may also allocate resources to a non-AP MLD in an unsolicited fashion to support a particular traffic stream in downlink (DL) or uplink (UL). A non-AP MLD with QoS management logic circuitry 619 may indicate support for QoS management capability by receiving and interpreting a management frame received from an AP MLD and also by generating and transmitting a management frame to an AP MLD including an element to indicate the QoS management capability features supported by the non-AP MLD.

It is understood that the above are only a subset of what the QoS management logic circuitry 619 may be configured to perform and that other functions included throughout this disclosure may also be performed by the QoS management logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
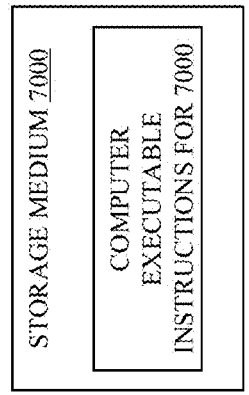
FIGS. 7-8 depict embodiments of a computer-readable storage medium and a computing platform to generate, transmit, receive, and decode management frames for discovery of QoS management capability.

FIG. 7 illustrates an example of a storage medium 7000 to store QoS management logic such as logic to implement the QoS management logic circuitry 619 shown in FIG. 6 and/or the other logic discussed herein to generate a non-OFDMA or OFDMA 320 MHz EHT PPDU comprising an MRU to merge 240 MHz transmission capabilities with the 320 MHz EHT PPDU. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 8:
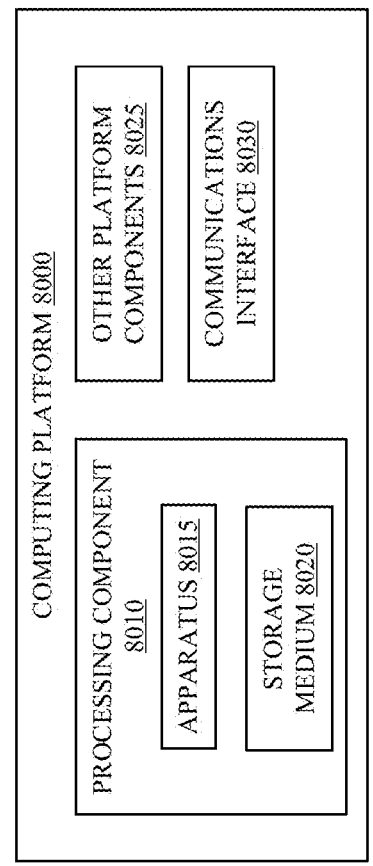

FIG. 8 illustrates an example computing platform 8000 such as the STAs 1210, 1230, 1290, 1292, 1294, 1296, and 1298 in FIG. 1A. In some examples, as shown in FIG. 8, computing platform 8000 may include a processing component 8010, other platform components or a communications interface 8030 such as the wireless network interfaces 1222 and 1252 shown in FIG. 1A. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Advantages of Some Embodiments

Several embodiments have one or more potentially advantages effects. For instance, use of QoS management logic circuitry, advantageously provide a single bit announcement in broadcast frames such as beacon frames to indicate the QoS management capability. QoS management logic circuitry, advantageously provide a bit pattern or a bit per QoS management capability feature, announcement in broadcast or unicast frames such as beacon frames and probe responses to indicate the QoS management capability. QoS management logic circuitry, advantageously provides mode detailed information to non-AP MLDs in response to requests via management frames such as probe requests, association requests, and reassociation requests. QoS management logic circuitry, advantageously signals that it is temporarily unable to provide QoS management or accept new QoS negotiation on one or more links. QoS management logic circuitry, advantageously signals, with a single bit that it is temporarily unable to provide QoS management or accept new QoS negotiation on all links. QoS management logic circuitry, advantageously signals, with a bit pattern or a bit per link that it is temporarily unable to provide QoS management or accept new QoS negotiation on one or more links.

EXAMPLES OF FURTHER EMBODIMENTS

The following examples pertain to further embodiments. Specifics in the examples may be used anywhere in one or more embodiments.

Example 1 is an apparatus comprising: a memory; and logic circuitry coupled with the memory to: generate an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and cause the transmission of the EHT PPDU. Example 2 is the apparatus of claim 1, wherein the logic circuitry comprises baseband processing circuitry and further comprising a radio coupled with the baseband processing circuitry, and one or more antennas coupled with the radio to transmit the EHT PPDU. Example 3 is the apparatus of claim 1, the MAC management frame comprising a beacon frame or a probe response frame. Example 4 is the apparatus of claim 1, the at least one bit value comprising a single bit value to signal QoS management capability associated with links in each of the more than one frequency bands. Example 5 is the apparatus of claim 1, the at least one bit value comprising a bit value for a bit value for each of multiple features of the QoS management capability, wherein at least one of the multiple features includes negotiation of an agreement to respect restricted TWT service periods. Example 6 is the apparatus of claim 1, the more than one frequency bands comprising two or more of 2.4 gigahertz (GHz), 5 GHz, and 6 GHz. Example 7 is the apparatus of claim 1, wherein the MAC management frame further comprises a QoS disabled field, the QoS disabled field comprising a single bit value to indicate that the QoS management capability associated with links in each of the more than one frequency bands is temporarily disabled. Example 8 is the apparatus of claim 1, wherein the MAC management frame further comprises a QoS disabled field, the QoS disabled field comprising multiple bit values, each of the bit values identifying one of the links, to individually identify each link of the links for which the QoS management capability associated with the link is temporarily disabled. Example 9 is the apparatus of claim 1, wherein the QoS management field resides in an element in a frame body of the management frame.

Example 10 is a non-transitory computer-readable medium, comprising instructions, which when executed by a processor, cause the processor to perform operations to: generate an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and cause the transmission of the EHT PPDU. Example 11 is the non-transitory computer-readable medium of claim 10, the MAC management frame comprising a beacon frame or a probe response frame. Example 12 is the non-transitory computer-readable medium of claim 10, the at least one bit value comprising a single bit value to signal QoS management capability associated with links in each of the more than one frequency bands. Example 13 is the non-transitory computer-readable medium of claim 10, the at least one bit value comprising a bit value for a bit value for each of multiple features of the QoS management capability, wherein at least one of the multiple features includes negotiation of an agreement to respect restricted TWT service periods. Example 14 is the non-transitory computer-readable medium of claim 10, the more than one frequency bands comprising two or more of 2.4 gigahertz (GHz), 5 GHz, and 6 GHz. Example 15 is the non-transitory computer-readable medium of claim 14, wherein the MAC management frame further comprises a QoS disabled field, the QoS disabled field comprising a single bit value to indicate that the QoS management capability associated with links in each of the more than one frequency bands is temporarily disabled. Example 16 is the non-transitory computer-readable medium of claim 10, wherein the MAC management frame further comprises a QoS disabled field, the QoS disabled field comprising multiple bit values, each of the bit values identifying one of the links, to individually identify each link of the links for which the QoS management capability associated with the link is temporarily disabled. Example 17 is the non-transitory computer-readable medium of claim 16, wherein the QoS management field resides in an element in a frame body of the management frame.

Example 18 is a method comprising: generating an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and causing the transmission of the EHT PPDU. Example 19 is the method of claim 18, the MAC management frame comprising a beacon frame or a probe response frame. Example 20 is the method of claim 18, the at least one bit value comprising a single bit value to signal QoS management capability associated with links in each of the more than one frequency bands. Example 21 is the method of claim 18, the at least one bit value comprising a bit value for a bit value for each of multiple features of the QoS management capability, wherein at least one of the multiple features includes negotiation of an agreement to respect restricted TWT service periods. Example 22 is the method of claim 18, the more than one frequency bands comprising two or more of 2.4 gigahertz (GHz), 5 GHz, and 6 GHz. Example 23 is the method of claim 22, wherein the MAC management frame further comprises a QoS disabled field, the QoS disabled field comprising a single bit value to indicate that the QoS management capability associated with links in each of the more than one frequency bands is temporarily disabled. Example 24 is the method of claim 18, wherein the MAC management frame further comprises a QoS disabled field, the QoS disabled field comprising multiple bit values, each of the bit values identifying one of the links, to individually identify each link of the links for which the QoS management capability associated with the link is temporarily disabled. Example 25 is the method of claim 24, wherein the QoS management field resides in an element in a frame body of the management frame.

Example 26 is a system comprising: one or more antennas; a radio coupled with the one or more antennas; a memory; baseband processing circuitry coupled with the radio and the memory to: generate an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and cause the transmission of the EHT PPDU via the one or more antennas. Example 27 is the system of claim 26, the MAC management frame comprising a beacon frame or a probe response frame. Example 28 is the system of claim 26, the at least one bit value comprising a single bit value to signal QoS management capability associated with links in each of the more than one frequency bands. Example 29 is the system of claim 26, the at least one bit value comprising a bit value for a bit value for each of multiple features of the QoS management capability, wherein at least one of the multiple features includes negotiation of an agreement to respect restricted TWT service periods. Example 30 is the system of claim 26, the more than one frequency bands comprising two or more of 2.4 gigahertz (GHz), 5 GHz, and 6 GHz. Example 31 is the system of claim 30, wherein the MAC management frame further comprises a QoS disabled field, the QoS disabled field comprising a single bit value to indicate that the QoS management capability associated with links in each of the more than one frequency bands is temporarily disabled. Example 32 is the system of claim 26, wherein the MAC management frame further comprises a QoS disabled field, the QoS disabled field comprising multiple bit values, each of the bit values identifying one of the links, to individually identify each link of the links for which the QoS management capability associated with the link is temporarily disabled. Example 33 is the system of claim 26, wherein the QoS management field resides in an element in a frame body of the management frame.

Example 34 is an apparatus comprising: a means for an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and a means for causing the transmission of the EHT PPDU. Example 35 is the apparatus of claim 34, wherein the means for generating an EHT PPDU comprises baseband processing circuitry and further comprises a radio coupled with the baseband processing circuitry, and one or more antennas coupled with the radio to transmit the EHT PPDU. Example 36 is the apparatus of claim 34, the MAC management frame comprising a beacon frame or a probe response frame. Example 37 is the apparatus of claim 34, the at least one bit value comprising a single bit value to signal QoS management capability associated with links in each of the more than one frequency bands. Example 38 is the apparatus of claim 34, the at least one bit value comprising a bit value for a bit value for each of multiple features of the QoS management capability, wherein at least one of the multiple features includes negotiation of an agreement to respect restricted TWT service periods. Example 39 is the apparatus of claim 34, the more than one frequency bands comprising two or more of 2.4 gigahertz (GHz), 5 GHz, and 6 GHz. Example 40 is the apparatus of claim 39, wherein the MAC management frame further comprises a QoS disabled field, the QoS disabled field comprising a single bit value to indicate that the QoS management capability associated with links in each of the more than one frequency bands is temporarily disabled. Example 41 is the apparatus of claim 34, wherein the MAC management frame further comprises a QoS disabled field, the QoS disabled field comprising multiple bit values, each of the bit values identifying one of the links, to individually identify each link of the links for which the QoS management capability associated with the link is temporarily disabled. Example 42 is the apparatus of claim 41, wherein the QoS management field resides in an element in a frame body of the management frame.

Example 43 is an apparatus comprising: a memory; and logic circuitry coupled with the memory to: receive an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and decode the EHT PPDU. Example 44 is the apparatus of claim 43, wherein the logic circuitry comprises baseband processing circuitry and further comprising a radio coupled with the baseband processing circuitry, and one or more antennas coupled with the radio to receive the EHT PPDU. Example 45 is the apparatus of claim 43, the MAC management frame comprising a beacon frame or a probe response frame. Example 46 is the apparatus of claim 43, the at least one bit value comprising a single bit value to signal QoS management capability associated with links in each of the more than one frequency bands. Example 47 is the apparatus of claim 43, the at least one bit value comprising a bit value for a bit value for each of multiple features of the QoS management capability, wherein at least one of the multiple features includes negotiation of an agreement to respect restricted TWT service periods. Example 48 is the apparatus of claim 43, the more than one frequency bands comprising two or more of 2.4 gigahertz (GHz), 5 GHz, and 6 GHz. Example 49 is the apparatus of claim 48, wherein the MAC management frame further comprises a QoS disabled field, the QoS disabled field comprising a single bit value to indicate that the QoS management capability associated with links in each of the more than one frequency bands is temporarily disabled. Example 50 is the apparatus of claim 43, wherein the MAC management frame further comprises a QoS disabled field, the QoS disabled field comprising multiple bit values, each of the bit values identifying one of the links, to individually identify each link of the links for which the QoS management capability associated with the link is temporarily disabled.

Example 51 is a non-transitory computer-readable medium, comprising instructions, which when executed by a processor, cause the processor to perform operations to: receive an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and decode the EHT PPDU. Example 52 is the non-transitory computer-readable medium of claim 51, the MAC management frame comprising a beacon frame or a probe response frame. Example 53 is the non-transitory computer-readable medium of claim 52, the at least one bit value comprising a single bit value to signal QoS management capability associated with links in each of the more than one frequency bands. Example 54 is the non-transitory computer-readable medium of claim 53, the at least one bit value comprising a bit value for a bit value for each of multiple features of the QoS management capability, wherein at least one of the multiple features includes negotiation of an agreement to respect restricted TWT service periods. Example 55 is the non-transitory computer-readable medium of claim 51, the more than one frequency bands comprising two or more of 2.4 gigahertz (GHz), 5 GHz, and 6 GHz. Example 56 is the non-transitory computer-readable medium of claim 51, wherein the MAC management frame further comprises a QoS disabled field, the QoS disabled field comprising a single bit value to indicate that the QoS management capability associated with links in each of the more than one frequency bands is temporarily disabled. Example 57 is the non-transitory computer-readable medium of claim 51, wherein the MAC management frame further comprises a QoS disabled field, the QoS disabled field comprising multiple bit values, each of the bit values identifying one of the links, to individually identify each link of the links for which the QoS management capability associated with the link is temporarily disabled.

Example 58 is a method comprising: receiving an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and decoding the EHT PPDU. Example 59 is the method of claim 58, the MAC management frame comprising a beacon frame or a probe response frame. Example 60 is the method of claim 58, the at least one bit value comprising a single bit value to signal QoS management capability associated with links in each of the more than one frequency bands. Example 61 is the method of claim 58, the at least one bit value comprising a bit value for a bit value for each of multiple features of the QoS management capability, wherein at least one of the multiple features includes negotiation of an agreement to respect restricted TWT service periods. Example 62 is the method of claim 58, the more than one frequency bands comprising two or more of 2.4 gigahertz (GHz), 5 GHz, and 6 GHz. Example 63 is the method of claim 63, wherein the MAC management frame further comprises a QoS disabled field, the QoS disabled field comprising a single bit value to indicate that the QoS management capability associated with links in each of the more than one frequency bands is temporarily disabled. Example 64 is the method of claim 58, wherein the MAC management frame further comprises a QoS disabled field, the QoS disabled field comprising multiple bit values, each of the bit values identifying one of the links, to individually identify each link of the links for which the QoS management capability associated with the link is temporarily disabled.

Example 65 is a system comprising: one or more antennas; a radio coupled with the one or more antennas; a memory; baseband processing circuitry coupled with the radio and the memory to: receive an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and decode the EHT PPDU. Example 66 is the system of claim 65, the MAC management frame comprising a beacon frame or a probe response frame. Example 67 is the system of claim 65, the at least one bit value comprising a single bit value to signal QoS management capability associated with links in each of the more than one frequency bands. Example 68 is the system of claim 65, the at least one bit value comprising a bit value for a bit value for each of multiple features of the QoS management capability, wherein at least one of the multiple features includes negotiation of an agreement to respect restricted TWT service periods. Example 69 is the system of claim 65, the more than one frequency bands comprising two or more of 2.4 gigahertz (GHz), 5 GHz, and 6 GHz. Example 70 is the system of claim 69, wherein the MAC management frame further comprises a QoS disabled field, the QoS disabled field comprising a single bit value to indicate that the QoS management capability associated with links in each of the more than one frequency bands is temporarily disabled. Example 71 is the system of claim 65, wherein the MAC management frame further comprises a QoS disabled field, the QoS disabled field comprising multiple bit values, each of the bit values identifying one of the links, to individually identify each link of the links for which the QoS management capability associated with the link is temporarily disabled.

Example 72 is an apparatus comprising: a means for receiving an extremely high throughput (EHT) physical layer protocol data unit (PPDU) comprising a medium access control (MAC) management frame, the MAC management frame comprising a QoS management field, the QoS management field comprising at least one bit value to indicate quality of service (QoS) management capability associated with links associated with more than one frequency bands; and a means for decoding the EHT PPDU. Example 73 is the apparatus of claim 72, the MAC management frame comprising a beacon frame or a probe response frame. Example 74 is the apparatus of claim 72, the at least one bit value comprising a single bit value to signal QoS management capability associated with links in each of the more than one frequency bands. Example 75 is the apparatus of claim 72, the at least one bit value comprising a bit value for a bit value for each of multiple features of the QoS management capability, wherein at least one of the multiple features includes negotiation of an agreement to respect restricted TWT service periods. Example 76 is the apparatus of claim 72, the more than one frequency bands comprising two or more of 2.4 gigahertz (GHz), 5 GHz, and 6 GHz. Example 77 is the apparatus of claim 72, wherein the MAC management frame further comprises a QoS disabled field, the QoS disabled field comprising a single bit value to indicate that the QoS management capability associated with links in each of the more than one frequency bands is temporarily disabled. Example 78 is the apparatus of claim 72, wherein the MAC management frame further comprises a QoS disabled field, the QoS disabled field comprising multiple bit values, each of the bit values identifying one of the links, to individually identify each link of the links for which the QoS management capability associated with the link is temporarily disabled.

What is claimed is:

1. An apparatus comprising:
a memory; and
logic circuitry coupled with the memory to:
generate an extremely high throughput (EHT) physical layer protocol data unit (PPDU) comprising a medium access control (MAC) management frame, the MAC management frame comprising a quality of service (QoS) management field, the QoS management field comprising a single bit value, the single bit value to indicate that the apparatus has a QoS management capability for multi-link devices (MLDs) or to indicate that the apparatus does not have a QoS management capability for MLDs for links in different frequency bands supported by the apparatus; and
cause a transmission of the EHT PPDU.

2. The apparatus of claim 1, wherein the logic circuitry comprises baseband processing circuitry and further comprising a radio coupled with the baseband processing circuitry, and one or more antennas coupled with the radio to transmit the EHT PPDU.

3. The apparatus of claim 1, the MAC management frame comprising a beacon frame or a probe response frame.

4. The apparatus of claim 1, the single bit value to signal the QoS management capability for all links in each of the different frequency bands.

5. The apparatus of claim 1, the logic circuitry to generate a subsequent frame comprising a bit value for each of multiple features of the QoS management capability, wherein at least one of the multiple features includes negotiation of an agreement to respect restricted target wake time (TWT) service periods.

6. The apparatus of claim 1, the different frequency bands comprising two or more of 2.4 gigahertz (GHz), 5 GHz, and 6 GHz.

7. The apparatus of claim 1, the logic circuitry to generate a subsequent frame comprising a QoS disabled field, the QoS disabled field comprising a different single bit value to indicate that the QoS management capability associated with the links in each of the different frequency bands is temporarily disabled.

8. The apparatus of claim 1, the logic circuitry to generate a subsequent frame comprising a QoS disabled field, the QoS disabled field comprising multiple bit values, each of the bit values identifying one of the links, to individually identify each link of the links for which the QoS management capability associated with the link is temporarily disabled.

9. The apparatus of claim 1, wherein the QoS management field resides in an element in a frame body of the management frame.

10. A non-transitory computer-readable medium, comprising instructions, which when executed by a processor, cause the processor to perform operations to:
generate an extremely high throughput (EHT) physical layer protocol data unit (PPDU) comprising a medium access control (MAC) management frame, the MAC management frame comprising a quality of service (QoS) management field, the QoS management field comprising a single bit value, the single bit value to indicate that the processor has a QoS management capability for multi-link devices (MLDs) or to indicate that the processor does not have a QoS management capability for MLDs for links in different frequency bands supported by the processor; and cause a transmission of the EHT PPDU.

11. The non-transitory computer-readable medium of claim 10, the MAC management frame comprising a beacon frame or a probe response frame.

12. The non-transitory computer-readable medium of claim 10, the single bit value to signal the QoS management capability for all links in each of the different frequency bands.

13. The non-transitory computer-readable medium of claim 10, the processor to generate a subsequent frame comprising a bit value for each of multiple features of the QoS management capability, wherein at least one of the multiple features includes negotiation of an agreement to respect restricted target wake time (TWT) service periods.

14. The non-transitory computer-readable medium of claim 10, the processor to generate a subsequent frame comprising a QoS disabled field, the QoS disabled field comprising a different single bit value to indicate that the QoS management capability associated with the links in each of the different frequency bands is temporarily disabled.

15. An apparatus comprising:
a memory; and
logic circuitry coupled with the memory to:
receive an extremely high throughput (EHT) physical layer protocol data unit (PPDU) comprising a medium access control (MAC) management frame, the MAC management frame comprising a quality of service (QoS) management field, the QoS management field comprising a single bit value, the single bit value to indicate that the apparatus has a QoS management capability for multi-link devices (MLDs) or to indicate that the apparatus does not have a QoS management capability for MLDs for links in different frequency bands supported by the apparatus; and
decode the EHT PPDU.

16. The apparatus of claim 15, wherein the logic circuitry comprises baseband processing circuitry and further comprising a radio coupled with the baseband processing circuitry, and one or more antennas coupled with the radio to receive the EHT PPDU.

17. The apparatus of claim 15, the MAC management frame comprising a beacon frame or a probe response frame.

18. The apparatus of claim 15, the single bit value to signal the QoS management capability for all links in each of the different frequency bands.

19. The apparatus of claim 15, the logic circuitry to receive a subsequent frame comprising a bit value for each of multiple features of the QoS management capability, wherein at least one of the multiple features includes negotiation of an agreement to respect restricted target wake time (TWT) service periods.

20. The apparatus of claim 15, the logic circuitry to receive a subsequent frame comprising a QoS disabled field, the QoS disabled field comprising a different single bit value to indicate that the QoS management capability associated with the links in each of the different frequency bands is temporarily disabled.

21. A non-transitory computer-readable medium, comprising instructions, which when executed by a processor, cause the processor to perform operations to:
receive an extremely high throughput (EHT) physical layer protocol data unit (PPDU) comprising a medium access control (MAC) management frame, the MAC management frame comprising a quality of service (QoS) management field, the QoS management field comprising a single bit value, the single bit value to indicate that the processor has a QoS management capability for multi-link devices (MLDs) or to indicate that the processor does not have a QoS management capability for MLDs for links in different frequency bands supported by the processor; and
decode the EHT PPDU.

22. The non-transitory computer-readable medium of claim 21, the single bit value to signal the QoS management capability for all links in each of the different frequency bands.

23. The non-transitory computer-readable medium of claim 21, the processor to receive a subsequent frame comprising a bit value for each of multiple features of the QoS management capability, wherein at least one of the multiple features includes negotiation of an agreement to respect restricted target wake time (TWT) service periods.

24. The non-transitory computer-readable medium of claim 21, the different frequency bands comprising two or more of 2.4 gigahertz (GHz), 5 GHz, and 6 GHz.

25. The non-transitory computer-readable medium of claim 21, the processor to receive a subsequent frame comprising a QoS disabled field, the QoS disabled field comprising a different single bit value to indicate that the QoS management capability associated with the links in each of the different frequency bands is temporarily disabled.

* * * * *